US012700406B2

(12) United States Patent
Tran et al.

(10) Patent No.: US 12,700,406 B2
(45) Date of Patent: Aug. 4, 2026

(54) METHOD, DEVICE AND SYSTEM OF A VOICE RESPONSIVE DEVICE BASED PARTICIPATIVE PUBLIC ENGAGEMENT COMPUTING PLATFORM

(71) Applicants: Richard Tran, Mountain View, CA (US); Goktug Duman, Miami, FL (US); Raj Abhyanker, Mountain View, CA (US); Mircea Voskerician, Mountain View, CA (US)

(72) Inventors: Richard Tran, Mountain View, CA (US); Goktug Duman, Miami, FL (US); Raj Abhyanker, Mountain View, CA (US); Mircea Voskerician, Mountain View, CA (US)

( * ) Notice: Subject to any disclaimer, the term of this patent is extended or adjusted under 35 U.S.C. 154(b) by 259 days.

(21) Appl. No.: 18/437,217

(22) Filed: Feb. 8, 2024

(65) Prior Publication Data

US 2025/0191584 A1    Jun. 12, 2025

Related U.S. Application Data

(60) Provisional application No. 63/608,394, filed on Dec. 11, 2023, provisional application No. 63/607,693,
(Continued)

(51) Int. Cl.
*G10L 15/22*        (2006.01)
*G06F 16/63*        (2019.01)
(Continued)

(52) U.S. Cl.
CPC .............. *G10L 15/22* (2013.01); *G06F 16/63* (2019.01); *G06F 40/40* (2020.01); *G06F 40/58* (2020.01);
(Continued)

(58) Field of Classification Search
USPC ......................................................... 704/3–7
See application file for complete search history.

(56) References Cited

U.S. PATENT DOCUMENTS 6,519,629 B2    2/2003   Harvey et al.
7,451,089 B1    11/2008  Gupta et al.
(Continued)

FOREIGN PATENT DOCUMENTS

CN    106027366 A    10/2016
CN    112435136 A     3/2021
(Continued)

OTHER PUBLICATIONS

"Generative Artificial Intelligence In Innovation Management: A Preview Of Future Research Developments", by Marcello Mariani et al., Published at Journal of Business Research, Published Online On [Feb. 14, 2024] https://www.sciencedirect.com/science/article/pil/S0148296324000468.
(Continued)

*Primary Examiner* — Leonard Saint-Cyr
(74) *Attorney, Agent, or Firm* — LegalForce RAPC Worldwide

(57)        ABSTRACT

A method, a device and/or a system of a generative AI based public engagement computing platform implemented using a processor communicatively coupled to a memory is disclosed. In accordance therewith, during a meeting relevant to a public engagement, a voice input to a voice responsive device associated with the generative AI based public engagement computing platform is automatically processed in accordance with contextualizing the voice input with respect to one or more issue(s) of an agenda item of the meeting based on training of the generative AI based public engagement computing platform with historical data, and transforming the contextualized voice input into actionable data. The actionable data is incorporated in a response to a
(Continued)

voice query to the generative AI based public engagement computing platform pertinent to the one or more issue(s), the agenda item, the public engagement, the meeting and/or a source of the voice input.

20 Claims, 16 Drawing Sheets

Related U.S. Application Data filed on Dec. 8, 2023, provisional application No. 63/607,699, filed on Dec. 8, 2023, provisional application No. 63/607,554, filed on Dec. 7, 2023.

(51) Int. Cl.

| | |
|---|---|
| *G06F 40/40* | (2020.01) |
| *G06F 40/58* | (2020.01) |
| *G06Q 30/0251* | (2023.01) |
| *G10L 15/00* | (2013.01) |
| *G10L 15/06* | (2013.01) |
| *G10L 15/18* | (2013.01) |
| *H04L 51/21* | (2022.01) |
| *H04L 67/306* | (2022.01) |
| *H04W 4/02* | (2018.01) |

(52) U.S. Cl.
CPC ........ *G06Q 30/0271* (2013.01); *G10L 15/005* (2013.01); *G10L 15/063* (2013.01); *G10L 15/1815* (2013.01); *H04L 51/21* (2022.05); *H04L 67/306* (2013.01); *H04W 4/02* (2013.01); *G10L 2015/223* (2013.01); *G10L 2015/228* (2013.01)

(56) References Cited

U.S. PATENT DOCUMENTS

| | | | |
|---|---|---|---|
| 8,407,049 B2 | 3/2013 | Cromack et al. | |
| 8,904,295 B2 | 12/2014 | Whalin et al. | |
| 9,009,592 B2 | 4/2015 | Friend et al. | |
| 9,245,254 B2 | 1/2016 | Lord et al. | |
| 9,753,914 B2 | 9/2017 | Yu | |
| 9,925,466 B2 | 3/2018 | Mizrahi et al. | |
| 10,298,410 B2 | 5/2019 | Whalin et al. | |
| 10,298,535 B2 | 5/2019 | Dange | |
| 10,510,051 B2 | 12/2019 | Nelson et al. | |
| 10,552,546 B2 * | 2/2020 | Nelson | G06F 40/58 |
| 10,693,669 B2 | 6/2020 | Dave et al. | |
| 10,757,148 B2 * | 8/2020 | Nelson | H04L 65/4015 |
| 10,778,656 B2 | 9/2020 | Li et al. | |
| 10,803,859 B1 | 10/2020 | Williams et al. | |
| 10,847,152 B2 | 11/2020 | Oh et al. | |
| 10,860,985 B2 * | 12/2020 | Nelson | G06Q 10/10 |
| 10,967,255 B2 | 4/2021 | Rosado | |
| 11,221,823 B2 | 1/2022 | Yoganandan et al. | |
| 11,307,735 B2 * | 4/2022 | Nelson | G06F 3/04817 |
| 11,375,380 B1 | 6/2022 | Voskerician et al. | |
| 11,386,920 B2 | 7/2022 | Ogawa et al. | |
| 11,483,273 B2 | 10/2022 | Mahmoud et al. | |
| 11,514,914 B2 | 11/2022 | McQuiston et al. | |
| 11,541,914 B2 * | 1/2023 | Arend | B61D 23/02 |
| 11,669,918 B2 | 6/2023 | Crook et al. | |
| 11,805,091 B1 | 10/2023 | Rapaport et al. | |
| 11,829,786 B2 | 11/2023 | Weiss et al. | |
| 11,848,012 B2 | 12/2023 | Hwang et al. | |
| 11,900,936 B2 | 2/2024 | Lindahl | |
| 11,961,516 B1 | 4/2024 | Leeds et al. | |
| 11,962,628 B2 * | 4/2024 | Polish | H04L 65/403 |
| 11,978,019 B2 | 5/2024 | Culver et al. | |
| 2005/0125246 A1 | 6/2005 | Muller et al. | |
| 2008/0184122 A1 | 7/2008 | Grant et al. | |
| 2017/0206064 A1 | 7/2017 | Breazeal et al. | |
| 2018/0101823 A1 * | 4/2018 | Nelson | H04N 7/155 |
| 2018/0101824 A1 * | 4/2018 | Nelson | H04L 12/1831 |
| 2018/0374108 A1 | 12/2018 | Kannan et al. | |
| 2019/0159003 A1 | 5/2019 | Padgett et al. | |
| 2020/0183966 A1 | 6/2020 | Perlegos | |
| 2020/0234380 A1 | 7/2020 | Dulori | |
| 2020/0403816 A1 | 12/2020 | Daredia et al. | |
| 2021/0173548 A1 | 6/2021 | Brown et al. | |
| 2021/0319408 A1 | 10/2021 | Jorasch et al. | |
| 2022/0206884 A1 | 6/2022 | Wyss | |
| 2022/0286310 A1 | 9/2022 | Rathnam et al. | |
| 2022/0319517 A1 | 10/2022 | Poltorak | |
| 2022/0343918 A1 | 10/2022 | Fu et al. | |
| 2023/0013581 A1 | 1/2023 | Nowak-Przygodzki et al. | |
| 2023/0032159 A1 | 2/2023 | Kalinichenko et al. | |
| 2023/0078154 A1 | 3/2023 | Boucheron et al. | |
| 2023/0245646 A1 | 8/2023 | Parthasarathy et al. | |
| 2023/0245651 A1 | 8/2023 | Wang | |
| 2023/0325590 A1 | 10/2023 | Shevchenko et al. | |
| 2023/0388141 A1 | 11/2023 | Malan et al. | |
| 2024/0064270 A1 | 2/2024 | Van Os et al. | |
| 2024/0089307 A1 | 3/2024 | Kalinichenko et al. | |
| 2024/0127514 A1 | 4/2024 | Clegg et al. | |
| 2024/0137733 A1 | 4/2024 | Frolovichev et al. | |
| 2024/0364552 A1 * | 10/2024 | Lu | H04L 12/1818 |
| 2024/0412720 A1 * | 12/2024 | Vasylyev | G06F 16/90332 |

FOREIGN PATENT DOCUMENTS

| | | | |
|---|---|---|---|
| CN | 111049663 B | 2/2022 | |
| CN | 110708607 B | 3/2022 | |
| CN | 112997451 B | 1/2024 | |
| CN | 116307757 B | 2/2024 | |
| KR | 20030034062 A | 5/2003 | |
| KR | 100528182 B1 | 11/2005 | |
| WO | 2010132271 A1 | 11/2010 | |
| WO | 2015041892 A1 | 3/2015 | |
| WO | 2020236341 A1 | 11/2020 | |
| WO | 2022022441 A1 | 2/2022 | |
| WO | 2023022774 A1 | 2/2023 | |
| WO | 2024097380 A1 | 5/2024 | |

OTHER PUBLICATIONS

"Responsible Urban Innovation with Local Government Artificial Intelligence (AI): A Conceptual Framework and Research Agenda", by Tan Yigitcanlar et al., Published at Journal of Open Innovation: Technology, Market, and Complexity, Published Online On [Feb. 24, 2021] https://www.mdpi.com/2199-8531/7//1/71.

"The Consequences of Generative AI for UGC and Online Community Engagement", by Gordon Burtch et al., Published at Boston University, Published Online On [Jul. 29, 2023] https://shorturl.at/ QIZxl.

"E-Government in Nigeria Can Generative Al Serve as a Tool for Civic Engagement?", by IAbdulrazaq Kayode Abdulkareem, Published at Public Governance, Administration and Finances Law Review, Published Online On [Apr. 29, 2024] https://tudasportal. uni-nke.hu/xmlui/bitstream/handle/20.500.12944/24994/10.53116-pgaflr.7068.pdf?sequence=1.

"A Survey On Providing Customer And Public Administration Based Services Using AI: Chatbot", by Krishna Kumar Nirala et al., Published at Multimedia Tools and Applications, Published Online On [Jan. 3, 2022] https://link.springer.com/content/pdf/10.1007/ s11042-021-11458-y.pdf.

"Conversational AI Dialogue Systems, Conversational Agents, and Chatbots", by Michael McTear, Published at Synthesis Lectures On Human Language Technologies, Published Online In [Oct. 2020] https://morganclaypoolpublishers.com/catalog_Orig/samples/ 9781636390321_sample.pdf.

"An Easy Introduction to Speech AI", by Mikiko Bazeley, Published at Nvidia, Published Online On [Jun. 23, 2022] https:// developer.nvidia.com/blog/an-easy-introduction-to-speech-ai/.

"Web-Based Automation Speech-to-Text Application using Audio Recording for Meeting Speech", by : Muhammad Yasir et al., Published by Journal of Physics: Conference Series, Published Online In [2019] https://iopscience.lop.org/article/10.1088/1742-6596/1230/1/012081/pdf.

(56)     References Cited

OTHER PUBLICATIONS

"Voice Recognition Techniques: A Review Paper", by Anupam Shukla et al., Published at International Research Journal of Engineering and Technology, Published Online In [Jun. 2020] https://www.irjet.net/archives/V7/16/IRJET-V716965.pdf.

"Community Storytelling Network, Expressive Digital Media Use, and Civic Engagement", by Seungahn Nah et al., Published at Communication Research, Published Online On [Jun. 4, 2021] http://www.liuwenlin.org/uploads/2/2/9/6/2296623/nah_lee_liu_-_2021.pdf.

"The Role of Public Relations in Social Capital and Civic Engagement", by Weiwu Zhang, Published at Communication Faculty Publications, Published Online In [2014] https://core.ac.uk/download/pdf/232830588.pdf.

"Power to the People? Opportunities and Challenges for Participatory AI", by Abeba Birhane et al., Published at Equity and Access in Algorithms, Mechanisms, and Optimization, Published Online In [Oct. 2022] https://dl.acm.org/doi/pdf/10.1145/3551624.3555290.

"The Adoption and Implementation of Artificial Intelligence Chatbots in Public Organizations: Evidence from U.S. State Governments", by Tzuhao Chen et al., Published at The American Review of Public Administration, Published Online On [Sep. 11, 2023] https://discovery.ucl.ac.uk/id/eprint/10174202/1/Chatbot_Final%20to%20Share.pdf.

"Generative Theories of Interaction", by Michel Beaudouin-Lafon et al., Published at Association for Computing Machinery, Published Online On [Sep. 2021] https://hal.science/hal-03434142/file/GenTheory%20authorversion.pdf.

"Experimenting with Public Engagement Platforms in Local Government", by Seongkyung Cho et al., Published at Urban Affairs Review, Published Online On [Jan. 7, 2020] https://sci-hub.usualwant.com/10.1177/1078087419897821.

"Empowering Local Communities Using Artificial Intelligence", by Yen-Chia Hsu et al., Published at Cornell University, Published Online On [Mar. 11, 2022] https://arxiv.org/pdf/2110.02007.

"Voice Recognition System", by Rabiu Quadri Olamilekan et al., Published at Researchgate, Published Online On [Apr. 17, 2024] https://shorturl.at/b0TgD.

* cited by examiner

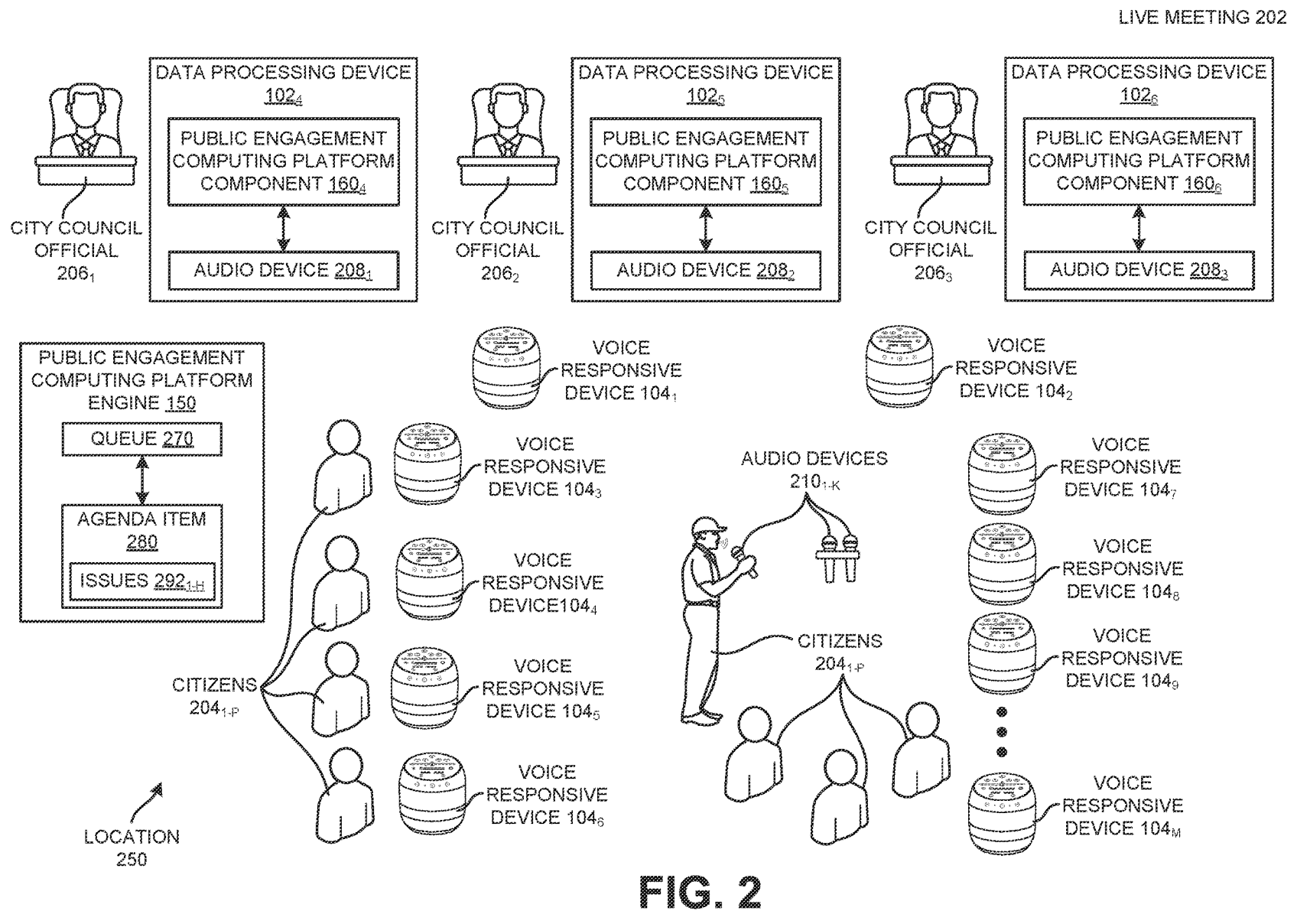

LIVE MEETING 202

DATA PROCESSING DEVICE 102₆

PUBLIC ENGAGEMENT COMPUTING PLATFORM COMPONENT 160₆

AUDIO DEVICE 208₃

CITY COUNCIL OFFICIAL 206₃

VOICE RESPONSIVE DEVICE 104₂

VOICE RESPONSIVE DEVICE 104₇

VOICE RESPONSIVE DEVICE 104₈

VOICE RESPONSIVE DEVICE 104₉

VOICE RESPONSIVE DEVICE 104ₘ

DATA PROCESSING DEVICE 102₅

PUBLIC ENGAGEMENT COMPUTING PLATFORM COMPONENT 160₅

AUDIO DEVICE 208₂

CITY COUNCIL OFFICIAL 206₂

VOICE RESPONSIVE DEVICE 104₁

AUDIO DEVICES 210₁₋ₖ

CITIZENS 204₁₋ₚ

DATA PROCESSING DEVICE 102₄

PUBLIC ENGAGEMENT COMPUTING PLATFORM COMPONENT 160₄

AUDIO DEVICE 208₁

CITY COUNCIL OFFICIAL 206₁

VOICE RESPONSIVE DEVICE 104₃

VOICE RESPONSIVE DEVICE104₄

VOICE RESPONSIVE DEVICE 104₅

VOICE RESPONSIVE DEVICE 104₆

PUBLIC ENGAGEMENT COMPUTING PLATFORM ENGINE 150

QUEUE 270

AGENDA ITEM 280

ISSUES 292₁₋ₕ

CITIZENS 204₁₋ₚ

LOCATION 250

FIG. 2

BUTTONS
314

STATUS
INDICATOR
312

STORES WRITTEN
COMMENTS 340 WITHIN

COSMETIC VIEW OF VOICE RESPONSIVE DEVICE
$104_{1-M}$

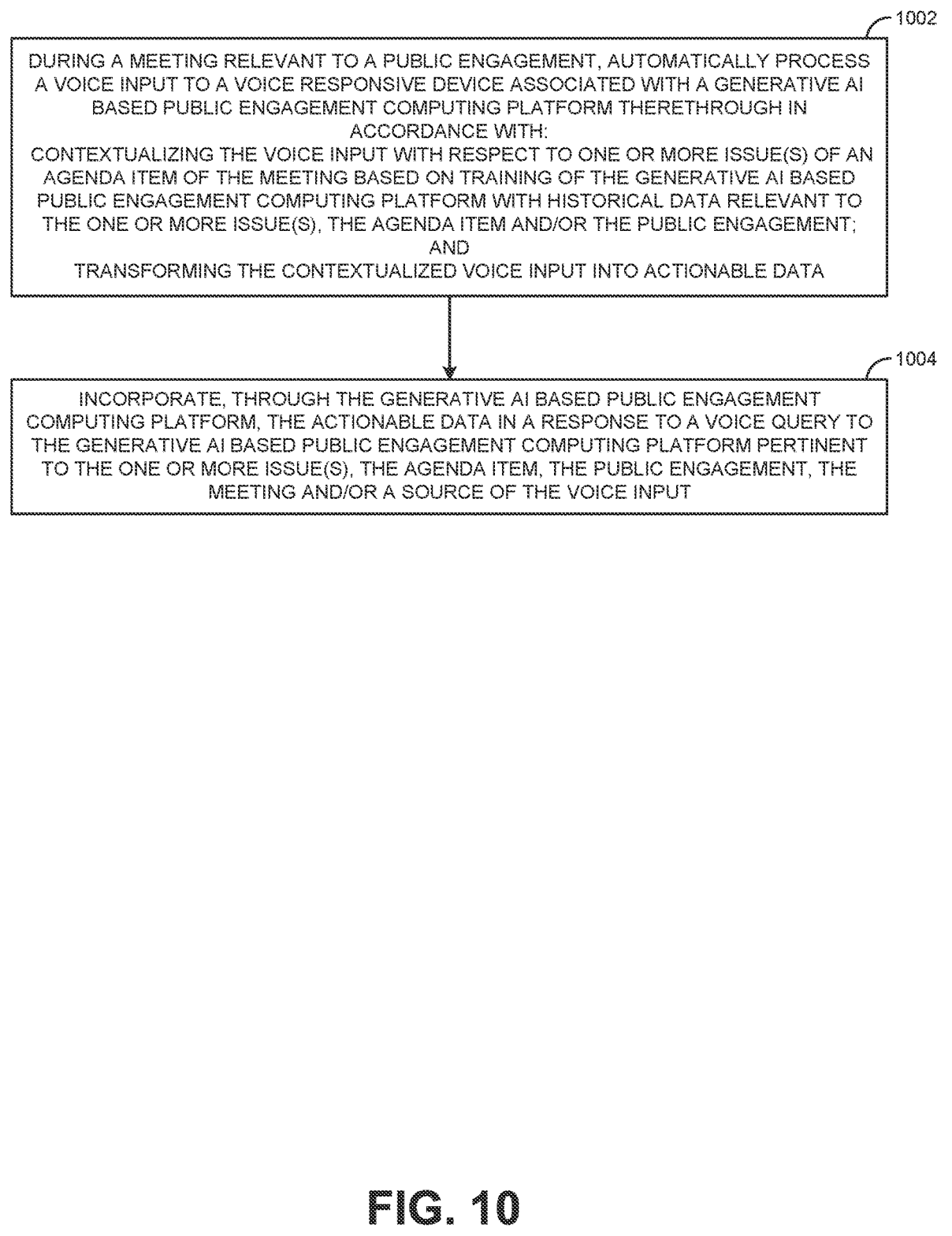

1002

DURING A MEETING RELEVANT TO A PUBLIC ENGAGEMENT, AUTOMATICALLY PROCESS A VOICE INPUT TO A VOICE RESPONSIVE DEVICE ASSOCIATED WITH A GENERATIVE AI BASED PUBLIC ENGAGEMENT COMPUTING PLATFORM THERETHROUGH IN ACCORDANCE WITH:
CONTEXTUALIZING THE VOICE INPUT WITH RESPECT TO ONE OR MORE ISSUE(S) OF AN AGENDA ITEM OF THE MEETING BASED ON TRAINING OF THE GENERATIVE AI BASED PUBLIC ENGAGEMENT COMPUTING PLATFORM WITH HISTORICAL DATA RELEVANT TO THE ONE OR MORE ISSUE(S), THE AGENDA ITEM AND/OR THE PUBLIC ENGAGEMENT;
AND
TRANSFORMING THE CONTEXTUALIZED VOICE INPUT INTO ACTIONABLE DATA

1004

INCORPORATE, THROUGH THE GENERATIVE AI BASED PUBLIC ENGAGEMENT COMPUTING PLATFORM, THE ACTIONABLE DATA IN A RESPONSE TO A VOICE QUERY TO THE GENERATIVE AI BASED PUBLIC ENGAGEMENT COMPUTING PLATFORM PERTINENT TO THE ONE OR MORE ISSUE(S), THE AGENDA ITEM, THE PUBLIC ENGAGEMENT, THE MEETING AND/OR A SOURCE OF THE VOICE INPUT

FIG. 10

PROJECTOR 1602 (DATA PROCESSING DEVICE 102₃₀)

PROCEEDINGS OF LIVE MEETING 202

TRANSCRIBED DATA 328/ TRANSLATED AUDIO DATA 424

WE, AS RESIDENTS OF XYZ, ARE OPPOSED ...

METHOD, DEVICE AND SYSTEM OF A VOICE RESPONSIVE DEVICE BASED PARTICIPATIVE PUBLIC ENGAGEMENT COMPUTING PLATFORM

CLAIM OF PRIORITY

This Application is a conversion Application of, claims priority to, and incorporates by reference herein the entirety of the disclosures of:

U.S. Provisional Patent Application No. 63/608,394 titled INTEGRATED AI-POWERED PUBLIC COMMENT ANALYSIS AND MANAGEMENT SYSTEM AND METHOD FOR PUBLIC ENGAGEMENT filed on Dec. 11, 2023, U.S. Provisional Patent Application No. 63/607,554 titled SMART INTERACTIVE VOICE-RESPONSIVE DEVICE AND SYSTEM OF ENHANCED CONSTITUENT COMMENT INTERPRETATION AND ANALYSIS IN PUBLIC MEETINGS filed on Dec. 7, 2023, U.S. Provisional Patent Application No. 63/607,693 titled PORTABLE INTERACTIVE COMMUNITY ENGAGEMENT AND FEEDBACK MICROPHONE SYSTEM filed on Dec. 8, 2023, and U.S. Provisional Patent Application No. 63/607,699 titled SMART INTERACTIVE VOICE-RESPONSIVE KIOSK AND SYSTEM OF ENHANCED CONSTITUENT COMMENT INTERPRETATION AND ANALYSIS FROM PUBLIC SPACES filed on Dec. 8, 2023.

FIELD OF TECHNOLOGY

This disclosure relates generally to computing platforms and, more particularly, to a method, a device and/or a system of a voice responsive device based participative public engagement computing platform.

BACKGROUND

A public meeting (e.g., a governance meeting, a legislative body meeting, an association meeting, a town hall) may serve as an important avenue of public participation and/or decision-making. However, feedback from participating members of a community pertinent to the meeting may be difficult to understand from the side of officialdom (e.g., commissioners, elected officials), especially when there are numerous participating members (e.g., constituents, residents) speaking and/or when meetings run late. The volume of information and/or feedback may be extensive. Moreover, an extensive number of public comments may be forthcoming even prior to and/or after the public meeting. Each speaker may bring in a unique set of points, concerns and/or opinions.

Officials may be tasked with not only listening to but also processing the vary array of information presented thereto. This may be cognitively demanding, as attention, comprehension and recall all may be involved, especially as a consequence of a lengthy meeting. The perspective of representatives of the community and/or the constituents may be diverse. Moreover, the representatives and/or the constituents may have varied backgrounds, experiences and/or priorities that lead to a wide range of perspectives being presented at the public meeting. These viewpoints may often be conflicting and/or contradictory with one another.

Officials may be responsible for understanding these diverse perspectives and considering them in their decision-making process. Achieving a balance or consensus amidst differing views may be complex and may require nuanced understanding and/or diplomacy. Also, there may be time constraints with respect to listening to comments. A public meeting that extends into the late hours of a day may pose challenges related to fatigue and/or reduced concentration. As the meeting progresses, the ability of the officials to attentively listen to and/or process new information may diminish. This may lead to less effective engagement with later comments and may impact the quality of decision-making.

Public comments may be disorganized. Specifically, public comments during, prior to and/or after public meetings may not always be presented in a structured manner. Residents, representatives and/or constituents may not focus on a specific topic at hand, or comments thereof may lack clarity, making it difficult for the officials to identify the relevant points and/or key messages. This lack of organization in the presentation of public comments may impede efficient and/or effective decision-making. The officials may even face emotional and/or political pressure in decision-making. Public comments may be emotionally charged, reflecting the passions and/or concerns of the community.

The officials may need to navigate these emotional expressions while maintaining objectivity and/or rationality in decision-making thereof. Additionally, the officials may have to consider the political implications of decisions thereof, which may add further complexity to roles thereof, especially during controversial and/or high-stakes situations. Further, the officials may be expected to make decisions shortly after the public comments are received. This may be challenging, given the need to rapidly process and/or consider a large volume of feedback, especially when that feedback contains complex and/or conflicting information. The pressure to make timely decisions may conflict with the need for thorough deliberation and/or consideration of public input.

SUMMARY

Disclosed are a method, a device and/or a system of a voice responsive device based participative public engagement computing platform.

In one aspect, a method of a generative Artificial Intelligence (AI) based public engagement computing platform implemented using a processor communicatively coupled to a memory is disclosed. The method includes, during a meeting relevant to a public engagement, automatically processing a voice input to a voice responsive device associated with the generative AI based public engagement computing platform. The automatic processing is in accordance with contextualizing the voice input with respect to one or more issue(s) of an agenda item of the meeting based on training of the generative AI based public engagement computing platform with historical data relevant to the one or more issue(s), the agenda item and/or the public engagement, and transforming the contextualized voice input into actionable data. The method also includes incorporating the actionable data in a response to a voice query to the generative AI based public engagement computing platform pertinent to the one or more issue(s), the agenda item, the public engagement, the meeting and/or a source of the voice input.

In another aspect, a voice responsive device of a generative AI based public engagement computing platform is disclosed. The voice responsive device includes an audio input device to, during a meeting relevant to a public engagement, automatically capture a voice input, a memory, and a processor communicatively coupled to the memory to execute a component of the generative AI based public engagement computing platform. In conjunction with the generative AI based public engagement computing platform, the component of the generative AI based public engagement computing platform automatically processes the voice input in accordance with contextualizing the voice input with respect to one or more issue(s) of an agenda item of the meeting based on training of the generative AI based public engagement computing platform with historical data relevant to the one or more issue(s), the agenda item and/or the public engagement, and transforming the contextualized voice input into actionable data. The voice responsive device also includes an audio output device to render the actionable data in response to a voice query to the component of the generative AI based public engagement computing platform pertinent to the one or more issue(s), the agenda item, the public engagement, the meeting and/or a source of the voice input.

In yet another aspect, a computing system includes a data processing device executing instructions associated with a generative AI based public engagement computing platform thereon, and a number of voice responsive devices, each executing a component of the generative AI based public engagement computing platform and communicatively coupled to the data processing device through a computer network. During a meeting relevant to a public engagement, the component of the generative AI based public engagement computing platform and/or the generative AI based public engagement computing platform automatically processes a voice input to the each voice responsive device in accordance with contextualizing the voice input with respect to one or more issue(s) of an agenda item of the meeting based on training of the generative AI based public engagement computing platform with historical data relevant to the one or more issue(s), the agenda item and/or the public engagement, and transforming the contextualized voice input into actionable data.

The component of the generative AI based computing platform and/or the generative AI based computing platform also incorporates the actionable data in a response to a voice query thereto pertinent to the one or more issue(s), the agenda item, the public engagement, the meeting and/or a source of the voice input.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 2 is a schematic view of a context in which the public engagement computing system of FIG. 1 is implemented, according to one or more embodiments.

FIG. 10 is a process flow diagram detailing the operations involved in realizing a voice responsive device based participative public engagement computing platform, according to one or more embodiments.

Other features of the present embodiments will be apparent from the accompanying drawings and from the detailed description that follows.

DETAILED DESCRIPTION

Example embodiments, as described below, may be used to provide a method, a device and/or a system of a voice responsive device based participative public engagement computing platform. Although the present embodiments have been described with reference to specific example embodiments, it will be evident that various modifications and changes may be made to these embodiments without departing from the broader spirit and scope of the various embodiments.

Figure 1:
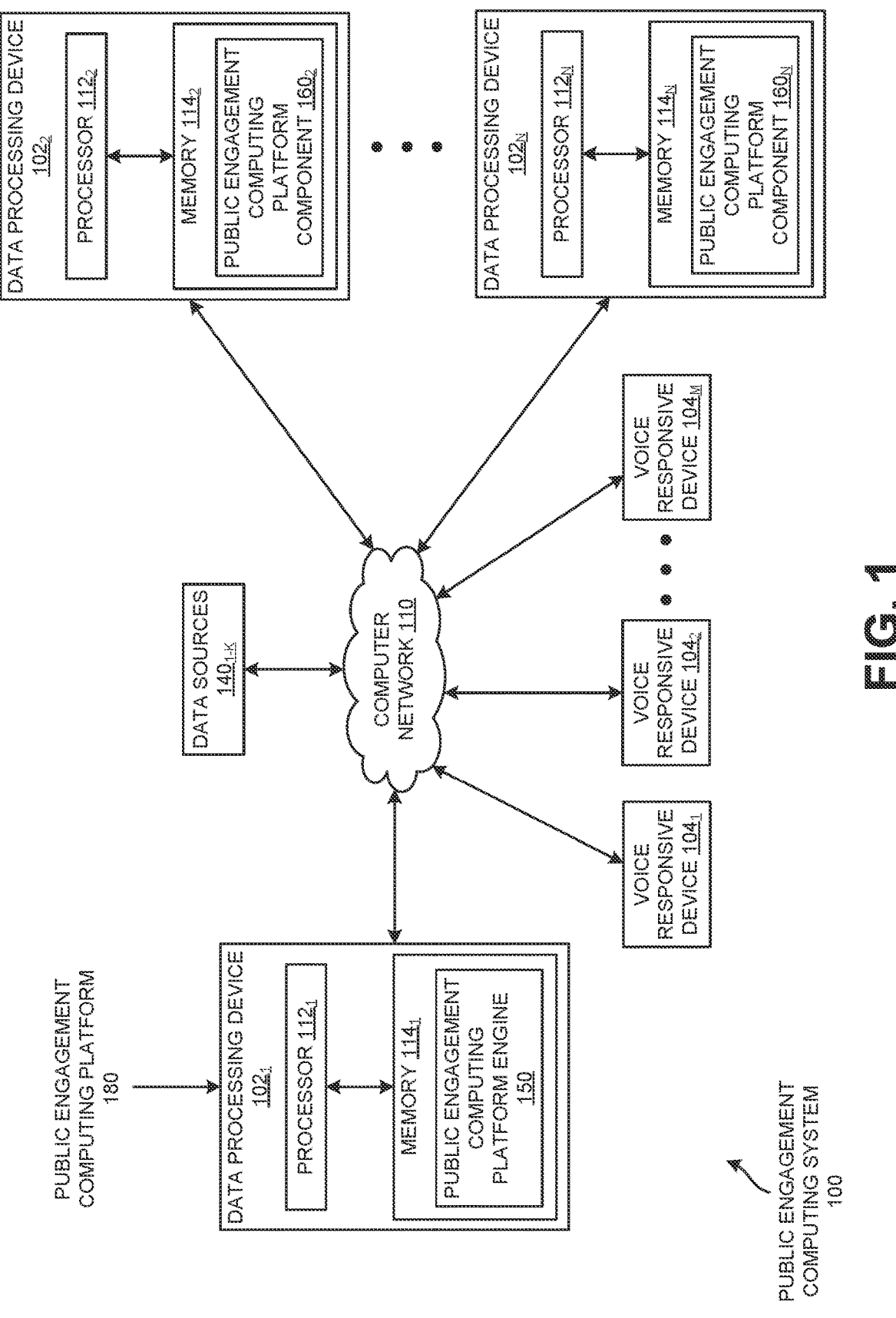
FIG. 1 is a schematic view of a public engagement computing system, according to one or more embodiments.

FIG. 1 shows a public engagement computing system 100, according to one or more embodiments. In one or more embodiments, public engagement computing system 100 may include a number of data processing devices $102_{1-N}$ communicatively coupled to one another through a computer network 110 (e.g., a public and/or a private computer network, a Wide Area Network (WAN), a Local Area Network (LAN), a short-range network, a mobile network).

In one or more embodiments, public engagement computing system 100 may be associated with local governments, state governments and/or central governments attempting to increase engagement with people and/or increase awareness in people about governmental/legislative processes. For example, public engagement computing system 100 may be associated with a live public meeting (e.g., a legislative body meeting, a governance meeting, an association meeting) involving public participation, expression of opinions and decision-making. In accordance therewith, public engagement computing system 100 may have a number of unique voice responsive devices $104_{1-M}$ communicatively coupled to one another and to data processing devices $102_{1-N}$ through computer network 110.

In one or more embodiments, data processing devices $102_{1-N}$ may include but are not limited to sophisticated servers (e.g., a cluster of servers, a distributed network of servers, a hybrid network of servers), standalone servers, laptops, desktops, portable mobile devices (e.g., mobile phones, tablets, smart multimedia players), standalone display units and smart display units. As will be discussed below in more detail, voice responsive devices $104_{1-M}$ may serve as enablers of participative, open democracy in public engagement computing system 100. In one or more embodiments, voice responsive devices $104_{1-M}$ may be virtual assistant-based devices that receive voice inputs (e.g., comments, discussions, commands) during the live public meeting across a spatial location thereof and may process and organize said inputs into actionable, structured data that help spread information and awareness instead of siloing the inputs and allowing for the loss thereof. In one or more embodiments, voice responsive devices $104_{1-M}$ may also capture and/or record said voice inputs for the processing, analyses and/or organization thereof. In one or more embodiments, voice responsive devices $104_{1-M}$ may be strategically distributed spatially across a location of the live public meeting to capture the aforementioned inputs.

FIG. 2 demonstrates a context in which public engagement computing system 100 may be implemented. A live meeting 202 may be held within the precincts of a city council building (e.g., a room of a City Hall Annex, the room of the City Hall Annex may be an example location 250). Citizens and/or residents (e.g., citizens $204_{1-P}$) of a city associated with the city council may speak before said city council during live meeting 202. City council officials $206_{1-3}$ (e.g., members, City Controller, Mayor, a clerk) may be at one or more data processing devices $102_{1-N}$ (data processing devices $102_{4-6}$ in FIG. 2). Each data processing device $102_{4-6}$ of city council officials $206_{1-3}$ may be associated/equipped with one or more audio device(s) (e.g., audio device $208_{1-3}$) such as but not limited to a microphone and a speaker.

In one or more embodiments, live meeting 202 may offer a forum for public participation in decision-making. In one or more embodiments, citizens $204_{1-P}$ may speak during live meeting 202 using audio devices $210_{1-K}$ (e.g., smart microphones) and inputs therefrom may be captured through voice responsive devices $104_{1-M}$. In some implementations, citizens $204_{1-P}$ may speak without the use of any audio device and inputs therefrom may still be captured through voice responsive devices $104_{1-M}$. Referring back to FIG. 1, in one or more embodiments, data processing device $102_1$ (e.g., a server, a distributed network of servers, a cluster of servers) may provide for a public engagement computing platform 180 by executing a public engagement computing platform engine 150 thereon that enables and provides for all functionalities and operations discussed herein. In some embodiments, each data processing device $102_{2-N}$ may execute a component (e.g., public engagement computing platform component $160_{2-N}$) of public engagement computing platform engine 150 thereon to provide a user interface to a user (e.g., city council officials $206_{1-3}$) thereof and to leverage functionalities and operations enabled through public engagement computing platform engine 150. FIG. 1 shows each data processing device $102_{1-N}$ as including a processor $112_{1-N}$ (e.g., a standalone processor/processor core, a cluster of processors, a distributed network of processors) communicatively coupled to a memory $114_{1-N}$ (e.g., a non-volatile and/or a volatile memory) and public engagement computing platform engine 150 stored in memory $114_1$ to be executed through processor $112_1$.

Figure 3:
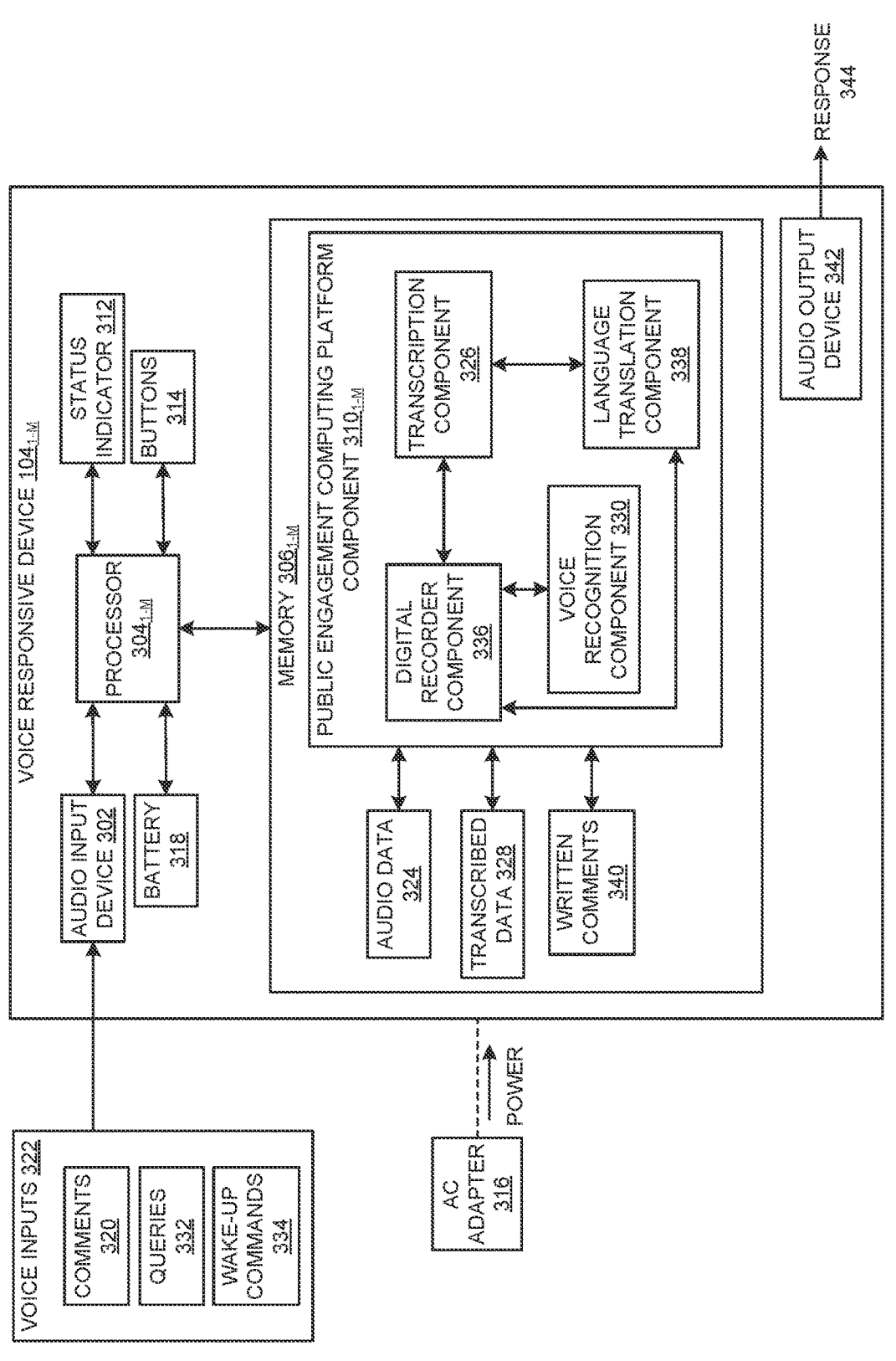
FIG. 3 is a schematic view of an example implementation of a voice responsive device of the public engagement computing system of FIGS. 1-2.

As shown in FIG. 2, voice responsive devices $104_{1-M}$ may be distributed across location 250 in accordance with the placement of citizens $204_{1-P}$ and/or city council officials $206_{1-3}$ to capture comments, feedback, opinions and/or other communicative messages from citizens $204_{1-P}$ and/or city council officials $206_{1-3}$. FIG. 3 shows an example implementation of voice responsive device $104_{1-M}$. In one or more embodiments, voice responsive device $104_{1-M}$ discussed herein may represent an improvement in the realm of civic engagement, local governance and/or participative and/or open democracy. In one or more embodiments, voice responsive device $104_{1-M}$ may be a smart device that takes in as input comments from the public (e.g., citizens $204_{1-P}$) and processes and interprets said comments during live meeting 202.

As seen in FIG. 3, in one or more embodiments, voice responsive device $104_{1-M}$ may include one or more audio input devices (e.g., audio input device 302; one audio input device 302 is just shown for example purposes; a high-quality, omni-directional microphone may be an example audio input device 302) to capture audio data (e.g., from citizens $204_{1-P}$, city council officials $206_{1-3}$) during live meeting 202 even in a large location 250 thereof. In one or more embodiments, audio input device 302 may be designed to minimize background noise and focus on speech captured as the audio data. In one or more embodiments, voice responsive device $104_{1-M}$ may include short-wave network communication capabilities such as but not limited to Wi-Fi® and Bluetooth®. For example, Wi-Fi® may be utilized to connect to the Internet (e.g., computer network 110) for sending captured audio data (e.g., audio files) to a data processing device $102_{1-N}$ (e.g., data processing device $102_{4-6}$, a control data processing device $102_{1-N}$, a storage server as data processing device $102_{1-N}$) of public engagement computing system 100, and Bluetooth® may be utilized to provide a direct connection to one or more data processing devices $102_{1-N}$ for immediate transfer of audio recordings.

As seen in FIG. 3, voice responsive device $104_{1-M}$ may additionally include internal storage capabilities to temporarily and/or permanently hold audio data in the form of recordings, according to one or more embodiments. In one or more embodiments, voice responsive device $104_{1-M}$ may include a processor $304_{1-M}$ (e.g., a microcontroller, a standalone processor) communicatively coupled to a memory $306_{1-M}$ (e.g., a volatile and/or a non-volatile memory). In one or more embodiments, voice responsive device $104_{1-M}$ may also execute another component of public engagement computing platform engine 150 as public engagement computing platform component $310_{1-M}$ thereon; public engagement computing platform component $310_{1-M}$ is shown as stored in memory $306_{1-M}$ in FIG. 3. The execution of public engagement computing platform component $310_{1-M}$ may enable voice responsive device $104_{1-M}$ to compress and format audio data in the form of files for efficient transmission and storage either locally or by leveraging the capabilities of public engagement computing platform engine 150 executing on data processing device 102₁ through computer network 110.

In one or more embodiments, while voice responsive device 104₁₋ₘ may be remotely controlled through data processing device 102₁₋ₙ (e.g., a laptop, a smartphone application, where the smartphone application may be an example public engagement computing platform component 160₂₋ₙ), voice responsive device 104₁₋ₘ may be provided with simple indicator devices (e.g., a status indicator 312 such as a Light Emitting Diode (LED) device) and one or more interfaces (e.g., buttons 314) for manual control (e.g., start recording, stop recording, mute) thereof. In one or more embodiments, voice responsive device 104₁₋ₘ may, via public engagement computing platform component 310₁₋ₘ/public engagement computing platform engine 150, integrate easily with various operating systems associated with data processing devices 102₁₋ₙ. In one or more embodiments, public engagement computing platform component 310₁₋ₘ/public engagement computing platform engine 150 may provide for encryption of audio data and secure transmission thereof to protect the privacy and confidentiality of discussions associated with live meeting 202.

In one or more embodiments, as shown in FIG. 3, voice responsive device 104₁₋ₘ may be powered via an Alternative Current (AC) adapter 316 and/or an in-built battery 318 (e.g., rechargeable battery, non-rechargeable battery) to accommodate portability and/or placement requirements thereof. For example, voice responsive devices 104₁₋ₘ may also be distributed across location 250 in accordance with availability of switch boards. In the case of each voice responsive device 104₁₋ₘ in FIG. 2 having battery 318, the aforementioned switch board-related restriction may not be applicable; voice responsive device 104₁₋ₘ may solely be distributed across location 250 in accordance with the placement of citizens 204₁₋ₚ and/or city council officials 206₁₋₃ and the coverage thereof. In one or more embodiments, customization and accessibility related settings such as sensitivity settings of audio input device 302 and audio recording quality may be provided within and/or enabled through voice responsive device 104₁₋ₘ. As will be discussed below, in one or more embodiments, voice responsive device 104₁₋ₘ may include features such as the capability to listen to and interpret voice commands and integrate with other smart devices. In one or more embodiments, in accordance with the requirement for audio recording in a public setting, voice responsive device 104₁₋ₘ may be required to comply with legal requirements and data privacy laws associated therewith.

In addition, in one or more embodiments, features such as real-time transcription (e.g., audio data to English or any other language) and/or transliteration (e.g., audio in one language and the transcript in another language) and/or integration with meeting management software (e.g., instructions associated therewith being part of public engagement computing platform engine 150 and enabled via public engagement computing platform component 310₁₋ₘ) may be enabled and/or made available through voice responsive device 104₁₋ₘ. In one or more embodiments, public engagement computing platform engine 150/public engagement computing platform component 160₂₋ₙ/public engagement computing platform component 310₁₋ₘ may facilitate real-time queuing and commenting during live meeting 202, as shown in FIG. 2. In one or more embodiments, a queue 270 may be maintained therefor as associated with public engagement computing platform engine 150. In one or more embodiments, queue 270 and/or commenting during live meeting 202 may provide for real-time recording and sharing of the public discourse associated therewith.

It should be noted that live meeting 202 may not just be a meeting in which citizens 204₁₋ₚ physically come to location 250 to participate. In some embodiments, live meeting 202 may be a virtual meeting in which citizens 204₁₋ₚ and/or city council officials 206₁₋₃ participate remotely (e.g., at respective data processing devices 102₁₋ₙ); the aforementioned personnel may be associated with a common geographical location (e.g., including location 250). Here, in one or more embodiments, voice responsive devices 104₁₋ₘ may be distributed at location 250 in proximity to one or more audio output device(s) (not shown) to record comments and/or opinions expressed from locations remote to location 250. In one or more embodiments, the aforementioned enablement of real-time recording and sharing of public discourse may allow for integrating virtual/live meetings analogous to live meeting 202 and rendering said meetings accessible via a number of data processing devices including data processing devices 102₂₋ₙ such as but not limited to laptops, desktops, mobile phones and even kiosks based on execution of public engagement computing platform engine 150/public engagement computing platform component 160₂₋ₙ.

In one or more embodiments, based on the recording of meetings and/or discussions on local issues, voice responsive device 104₁₋ₘ, in conjunction with public engagement computing platform engine 150, may enable involvement of citizens (e.g., citizens 204₁₋ₚ)/people from diverse backgrounds in civic discussions. In one or more embodiments, the audio recordings discussed herein may be utilized to synthesize comments from the public, thereby providing for incorporation of community inputs to improve decision-making. In one or more embodiments, the sharing of the aforementioned audio recordings (e.g., of meetings such as live meeting 202, comments and/or discussions associated therewith) may foster a sense of connection and community involvement. In one or more embodiments, the aforementioned audio recordings and information associated therewith may be shared through local agencies and a community (e.g., a social network, a forum for discussion and/or information access) built around local issues.

In one or more embodiments, voice responsive device 104₁₋ₘ, in conjunction with public engagement computing platform engine 150, may consolidate various forms of public input (e.g., spoken comments) into an integrated system that is public engagement computing system 100. In one or more embodiments, the audio recordings through voice responsive devices 104₁₋ₘ may be integrated into public engagement computing system 100 whose scope may extend to geographical areas including but not limited to towns, cities, states and even countries; the aforementioned audio recordings may assist these geographical areas and/or legislative bodies associated therewith in saving time and resources involved in processing public discourse. In one or more embodiments, as will be discussed below, the audio data gathered through voice responsive devices 104₁₋ₘ may be processed through advanced Natural Language Processing (NLP) algorithms implemented through public engagement computing platform engine 150. In one or more embodiments, this may help analyze public comments, identify concerns of the public (e.g., citizens 204₁₋ₚ), track sentiment trends of the public, aid data-driven decision-making and/or enhance civic engagement and/or government and/or legislative body responsiveness.

In one or more embodiments, by way of providing audio recordings of meetings analogous to live meeting 202, voice responsive device $104_{1-M}$, powered by public engagement computing platform engine 150, may offer a portal for community members (e.g., citizens $204_{1-P}$) to engage in local discussions, thereby expanding stakeholder participation in local governmental decision-making processes. As will be discussed below, voice responsive device $104_{1-M}$ may offer sophisticated capabilities to enhance management and/or analyses of public comments gathered during public meetings analogous to live meeting 202.

In one or more embodiments, the capturing of audio by voice responsive device $104_{1-M}$ may provide for automatic real-time and/or post-meeting transcription of the above-mentioned comments, thereby creating a written record for easy review and/or reference. In one or more embodiments, the aforementioned transcriptions may be catalogued and aligned with specific agenda items pertinent to live meeting 202; this may enable members of legislative bodies and/or officials (e.g., city council officials $206_{1-3}$) quickly locate relevant comments and/or search through said comments.

In one or more embodiments, advanced NLP techniques implemented via public engagement computing platform engine 150 may analyze the abovementioned transcriptions to understand the tone, sentiment and/or emotional context of the comments. In one or more embodiments, insights gleaned from analyses of the aforementioned transcriptions may be integrated live into public engagement computing platform engine 150, thereby being available for use by local legislative bodies and/or governments in a streamlined manner. As will be discussed below, in one or more embodiments, weights (or relevance scores) may be assigned to comments based on identity and/or geographical proximity of a user (e.g., citizens $204_{1-P}$, community/social network/forum participant; geographical information 440 discussed below may be referenced for the same) of public engagement computing platform engine 150 to one or more issue(s) at hand; this may prioritize feedback to public engagement computing platform engine 150 and/or the relevant legislative body/government (e.g., city council officials $206_{1-3}$) based on direct impact and/or relevance.

In one or more embodiments, a user (e.g., a citizen $204_{1-P}$) may speak during the course of live meeting 202, thereby providing a comment (e.g., comments 320 that are a subset of voice inputs 322) to voice responsive device $104_{1-M}$) to be recorded via voice responsive device $104_{1-M}$. In one or more embodiments, as part of public engagement computing platform component $310_{1-M}$ in memory $306_{1-M}$, public engagement computing platform component $310_{1-M}$ may have a digital recorder component 336 implemented therein to record comments 320 as audio data 324 (e.g., in the form of audio files). In one or more embodiments, audio data 324 may be transmitted to data processing device $102_1$/public engagement computing platform engine 150 for analysis thereat. In one or more embodiments, public engagement computing platform component $310_{1-M}$ on voice responsive device $104_{1-M}$ may also have a transcription component 326 implemented therein to transcribe (e.g., automatically in real-time, post hoc, based on clicking an interface such as a button) the captured audio data 324 as transcribed data 328.

In addition to or alternatively, in one or more embodiments, audio data 324 may be transcribed at data processing device $102_1$ executing public engagement computing platform engine 150 and transcribed data 328 may be available thereat. In some embodiments, audio data 324 and/or transcribed data 328 may be transmitted to public engagement computing platform engine 150 for analyses therethrough depending on where the transcription is done. In one or more embodiments, a voice recognition component 330 may be implemented in public engagement computing platform component $310_{1-M}$ to specifically recognize the voices of individual officials (e.g., city council officials $206_{1-3}$) and/or eminent/pertinent citizens (e.g., citizens $204_{1-P}$).

For example, based on implementation of voice recognition through public engagement computing platform engine 150 and public engagement computing platform component $310_{1-M}$, data processing device $102_1$ may be trained to recognize voices of individual city council officials $206_{1-3}$ input through voice responsive device $104_{1-M}$. City council officials $206_{1-3}$ may initiate queries (e.g., queries 332 shown in FIG. 3 as another input to voice responsive device $104_{1-M}$; queries 332 may be also be a subset of voice inputs 322) based on addressing voice responsive device $104_{1-M}$ with "Hey GovGPT™!" "Hey GovGPT™!," "GovGPT™!" and/or other words and/or combinations thereof may serve as wake-up commands (e.g., wake-up commands 334 may be another subset of voice inputs 322; wake-up commands 334 may be customizable) to voice responsive device $104_{1-M}$ and/or the generative Artificial Intelligence (AI) capabilities of public engagement computing platform engine 150 associated therewith.

A city council official $206_{1-3}$ may request specific elements of the abovementioned analyses through public engagement computing platform engine 150 such as tallying of votes for and/or against an agenda item (e.g., agenda item 280 associated with live meeting 202 stored in data processing device $102_1$ and/or one or more other data processing devices $102_{1-N}$) based on comments 320 (e.g., from city council officials $206_{1-3}$ and/or citizens $204_{1-P}$; the scope may extend across territories and may not be limited to location 250). In another example, public engagement computing platform engine 150 may summarize viewpoints from specific residents (e.g., citizens $204_{1-P}$) and/or groups based on analyzing a repository of comments (e.g., including comments 320). The aforementioned may utilize advanced NLP processing to identify relevant comments and to synthesize information therefrom. In one or more embodiments, voice response device $104_{1-M}$ may have an audio output device 342 to render/provide a response 344 to a voice input thereto 322 that includes actionable data 438 incorporated therein, as will be seen below.

Figure 4:
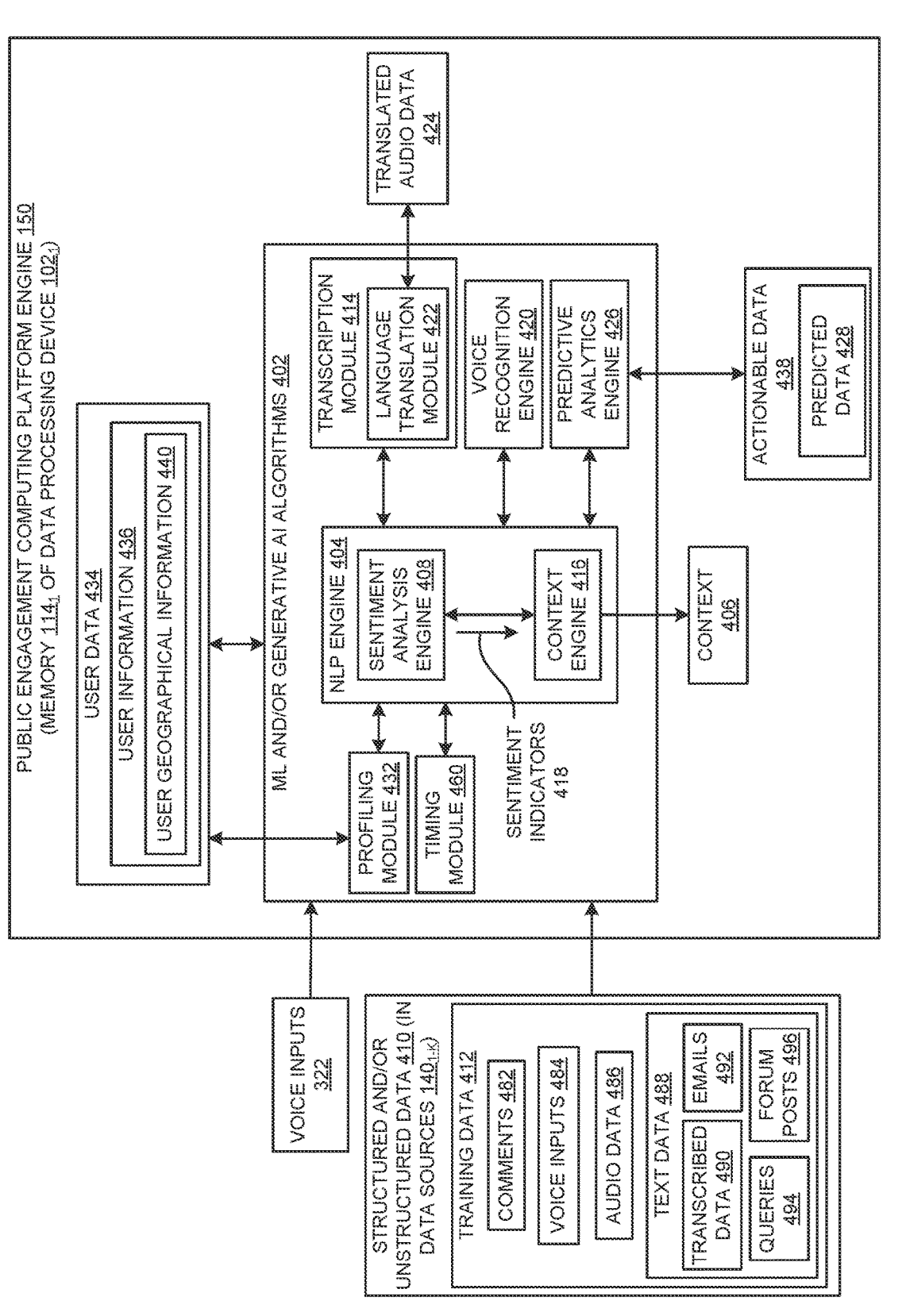
FIG. 4 is a schematic view of a public engagement computing platform engine executing on a data processing device of the public engagement computing system of FIG. 1, according to one or more embodiments

FIG. 4 shows public engagement computing platform engine 150 executing on data processing device $102_1$, according to one or more embodiments. In accordance with the processing and functionality requirements herein, in one or more embodiments, public engagement computing platform engine 150 may include Machine Learning (ML) and/or generative Artificial Intelligence (AI) algorithms 402 implemented therein. Again, while FIG. 4 shows ML and/or generative AI algorithms 402 as executing solely on data processing device $102_1$, it should be noted that execution thereof may be distributed across more than one data processing device $102_{1-N}$. In one or more embodiments, ML and/or generative AI algorithms 402 may include an NLP engine 404 to analyze a language of voice inputs 322/audio data 324 (and even transcribed data 328) discussed above to extract context 406 therefrom. In some embodiments, context 406 extracted may be based on, among other things, a sentiment analysis through sentiment analysis engine 408 that is part of NLP engine 404.

For example, the sentiment analysis may involve simple rule-based analyses, complex sets of ML-based analyses (e.g., based on training ML and/or generative AI algorithms 402 with structured and/or unstructured data 410 (e.g., including training data 412) to recognize patterns and/or specific elements based on tagging and/or other forms of classifiers) and/or mixed analyses that extract and/or score relevant elements (e.g., nouns) within voice inputs 322/ audio data 324 (and transcribed data 328). "Structured data," as discussed herein, may refer to data in standardized and/or predefined formats (e.g., tabular data). "Unstructured data," as discussed herein, may refer to unclassified and/or unsorted information in random and/or non-standard formats and may exist in the form of multimedia (e.g., unsorted text data, video data, audio data, image data), forum posts, social media posts, sensor data and/or Internet of Things (IoT) data. Both "structured data" and "unstructured data" may be "human" and/or "machine" generated. In one or more embodiments, referring back to FIG. 1, public engagement computing system 100 may include a number of data sources $140_{1-K}$ (e.g., may be one or more data processing devices $102_{1-N}$ itself) communicatively coupled to one or more data processing devices $102_{1-N}$(FIG. 1 shows data sources 1401-K communicatively coupled to all data processing devices $102_{1-N}$ via computer network 110 for example purposes) via computer network 110.

In one or more embodiments, one or more data sources $140_{1-K}$ (e.g., storage systems, databases, memory/storage units of data processing devices $102_{1-N}$) may serve as a repository of data including historical data not limited to comments 482 (e.g., analogous to comments 320, may also be text comments), voice inputs 484 (e.g., analogous to voice inputs 322), audio data 486 (e.g., analogous to audio data 324) and text data 488 such as transcribed data 490 (analogous to transcribed data 328), electronic mails (emails) 492, queries 494 (analogous to queries 332) and forum posts 496; the aforementioned data may relate to past meetings (e.g., analogous to live meeting 202; issues pertaining to agenda items thereof) and discussions and/or comments associated therewith. In one or more embodiments, the aforementioned data from the one or more data sources $140_{1-K}$ may be leveraged as training data 412 to train ML and/or generative AI algorithms 402.

In one or more embodiments, ML and/or generative AI algorithms 402 may include a transcription module 414 whose component is transcription component 326 discussed above to transcribe (e.g. as transcribed data 328) the captured audio data 324 upon transmission of audio data 324 thereto. Thus, in one or more embodiments, the transcription may be performed at voice responsive device $104_{1-M}$ and/or data processing device $102_1$. In one or more embodiments, the transcription may be done in "real-time" or near "real-time" with respect to audio capturing at live meeting 202. Alternatively or additionally, in one or more embodiments, the transcription may be done post facto.

It should be noted that comments 320, voice inputs 322, audio data 324, transcribed data 328 and/or the like may be leveraged as training data 412 to further refine ML and/or generative AI algorithms 402 over time. In one or more embodiments, the aforementioned data may be interpreted by a context engine 416 of NLP engine 404 to determine one or more reason(s) for citizens $204_{1-P}$ to "feel" a particular way about an issue relevant to agenda item 280 as context 406. In one or more embodiments, the "feelings" and/or sentiments of citizens $204_{1-P}$ may be determined through sentiment analysis engine 408 as sentiment indicators 418. In one or more embodiments, sentiment analysis engine 408 may implement complex sentiment analysis (e.g., based on scores, proximity of sentiment indicators 418) therethrough to serve as insights derived even from seemingly ambiguous sentences spoken by citizens $204_{1-P}$.

In one or more embodiments, ML and/or generative AI algorithms 402 may additionally implement a voice recognition engine 420 whose component is voice recognition component 330; voice recognition engine 420 may be trained (e.g., using training data 412) to recognize the voices of individual officials (e.g., city council officials $206_{1-3}$) and/or eminent/pertinent citizens (e.g., citizens $204_{1-P}$), as discussed above with reference to voice recognition component 330. In one or more embodiments, the aforementioned voice recognition may thus be performed through voice responsive device $104_{1-M}$ and/or data processing device $102_1$. In one or more embodiments, additional features and/or operations may be performed based on the voice recognition, as will be discussed below.

In one or more embodiments, ML and/or generative AI algorithms 402 may implement a language translation module 422 to effect "real-time" or near "real-time" translation of comments 320 into one or more languages other than English and/or the dominant language of communication during live meeting 202. While FIG. 4 shows language translation module 422 as being part of transcription module 414, implementation thereof may be separate from one another. The translation of comments 320 may promote inclusivity for non-dominant language (e.g., non-English) speakers. In one or more embodiments, a component of language translation module 422 may execute as part of public engagement computing platform component $310_{1-M}$ as language translation component 338. In addition to rendering of the translated data on screen, e.g., on a display unit associated with a data processing device $102_{1-N}$ for consumption by non-dominant language speakers among citizens $204_{1-P}$, it should be noted that language translation module 422/language translation component 338 may cause translation of audio data 324 in audio data form itself as translated audio data 424 for reference and/or downloading.

In one or more embodiments, as discussed above, analysis of past public comments (e.g., comments 482), voice inputs 484, audio data 486 and text data 488 may help identification of recurring issues, concerns and/or topics, thereby providing for efficient long-term planning and policy development. In one or more embodiments, ML and/or generative AI algorithms 402 may also leverage trends gleaned from the aforementioned comments 482, voice inputs 484, audio data 486 and text data 488 to predict (e.g., through predictive analytics engine 426 as predicted data 428) future concerns and/or issues that may arise in the community. In one or more embodiments, topics and/or issues discussed and/or mentioned in the past may be analyzed from the aforementioned data based on sentiment indicators 418 (e.g., the higher a value associated with an aggregate sentiment indicator 418, the more emotionally charged the issue and/or the topic) to prioritize agenda items (e.g., including agenda item 280) for future meetings. For example, agenda item 280 may be arrived at by ML and/or generative AI algorithms 402 based on the aforementioned analyses of past topics and/or issues.

Figure 5:
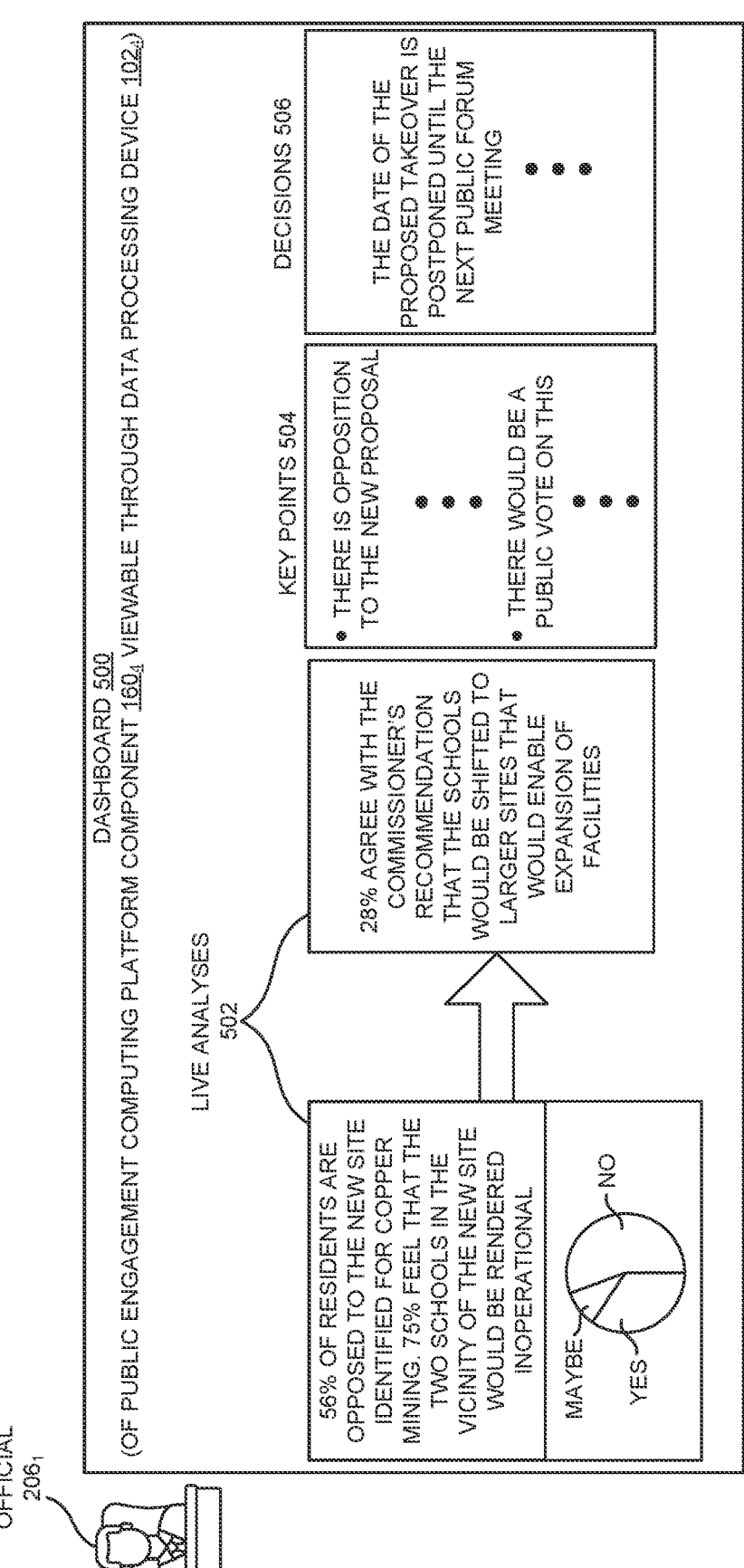
FIG. 5 is a schematic and illustrative view of an example dashboard provided by the public engagement computing platform engine or a public engagement computing platform component of the public engagement computing system of FIG. 1 viewable through a data processing device thereof.

It should be noted that citizens $204_{1-P}$ may not be limited to physical and/or virtual participants in live meeting 202; citizens $204_{1-P}$ may also include members of the public that have left footprints by way of comments 482, voice inputs 484, audio data 486 and/or text data 488. In one or more embodiments, citizens $204_{1-P}$ that have left footprints (including comments 320, voice inputs 322, audio data 324 et al.) may be profiled (e.g., dynamically) through profiling module 432 of ML and/or generative AI algorithms 402 to enable city council officials $206_{1-3}$/staff members thereof understand perspectives of individuals such as prominent and/or frequent contributors. FIG. 5 shows an example dashboard 500 (e.g., provided by public engagement computing platform engine 150/public engagement computing platform component 160₄) viewable through a data processing device 102₄ of a city council official 206₁. As seen in FIG. 5, dashboard 500 may offer live analyses (e.g., real-time analyses 502) of public sentiments as mapped to agenda item 280. Also, dashboard 500, by way of public engagement computing platform engine 150, may offer (e.g., automatically) summaries of key points and/or decisions from each meeting (e.g., live meeting 202) for public dissemination. FIG. 5 shows automatically generated key points 504 and/or decisions 506 gleaned from live meeting 202. It should be noted that city council officials 2061 may edit and/or modify key points 504 and/or decisions 506 through dashboard 500 and/or public engagement computing platform component 1604, thereby serving as an expert in training ML and/or generative AI algorithms 402 better and/or to provide feedback thereto.

It should be noted that, in one or more embodiments, remote participation (e.g., by citizens 204₁₋ₚ) may be enhanced through Virtual Reality (VR) integration with public engagement computing platform component 160₂₋ₙ as enabled through public engagement computing platform engine 150. In other words, in one or more embodiments, public engagement computing platform engine 150/public engagement computing platform component 160₂₋ₙ may provide for integration with VR headsets, VR devices and/or multi-projection environments. In one or more embodiments, in contexts such as live meeting 202, a total time allotted for citizens 204₁₋ₚ to speak and/or a time allotted per citizen 204₁₋ₚ may need to be controlled; for the aforementioned purpose, ML and/or generative AI algorithms 402 may include a timer module 460. In one or more embodiments, while timer module 460 may be controlled through any city council official 206₁₋₃, it may be preferable for a clerk assisting other city council officials 206₁₋₃ during live meeting 202 to have control over times allotted to citizens 204₁₋ₚ during live meeting 202. As seen above, the clerk may also be an example city council official 206₁₋₃.

Also, as discussed above, in one or more embodiments, the execution of one or more modules, algorithms and/or engines of public engagement computing platform engine 150 and/or public engagement computing platform engine 150 itself may not be limited to data processing device 102₁ and may be distributed across one or more data processing devices 102₁₋ₙ. Additionally or alternatively, public engagement computing platform component 160₂₋ₙ may also offer one or more of the aforementioned modules and/or engines of public engagement computing platform engine 150 locally and/or in conjunction with data processing device 102₁ executing public engagement computing platform engine 150, as will be seen below.

Referring back to FIG. 4, profiling module 432 may generate and/or leverage user data 434 that includes compartmentalized data specific to individual citizens 204₁₋ₚ. In one or more embodiments, as part of user data 434, user information 436 (e.g., email addresses, phone numbers, residential addresses) collected and/or extracted by and/or through public engagement computing platform engine 150 may be utilized to automatically notify citizens 204₁₋ₚ when issues commented on thereby are addressed and/or commented in live meeting 202. For example, a citizen 204₁₋ₚ may be emailed a summary of live meeting 202 as pertinent to the issue commented thereby; additionally or alternatively, a notification/message may be pushed to a device (e.g., a mobile device, one or more of data processing devices 160₂₋ₙ) thereof via public engagement computing platform component 160₂₋ₙ.

Figure 6:
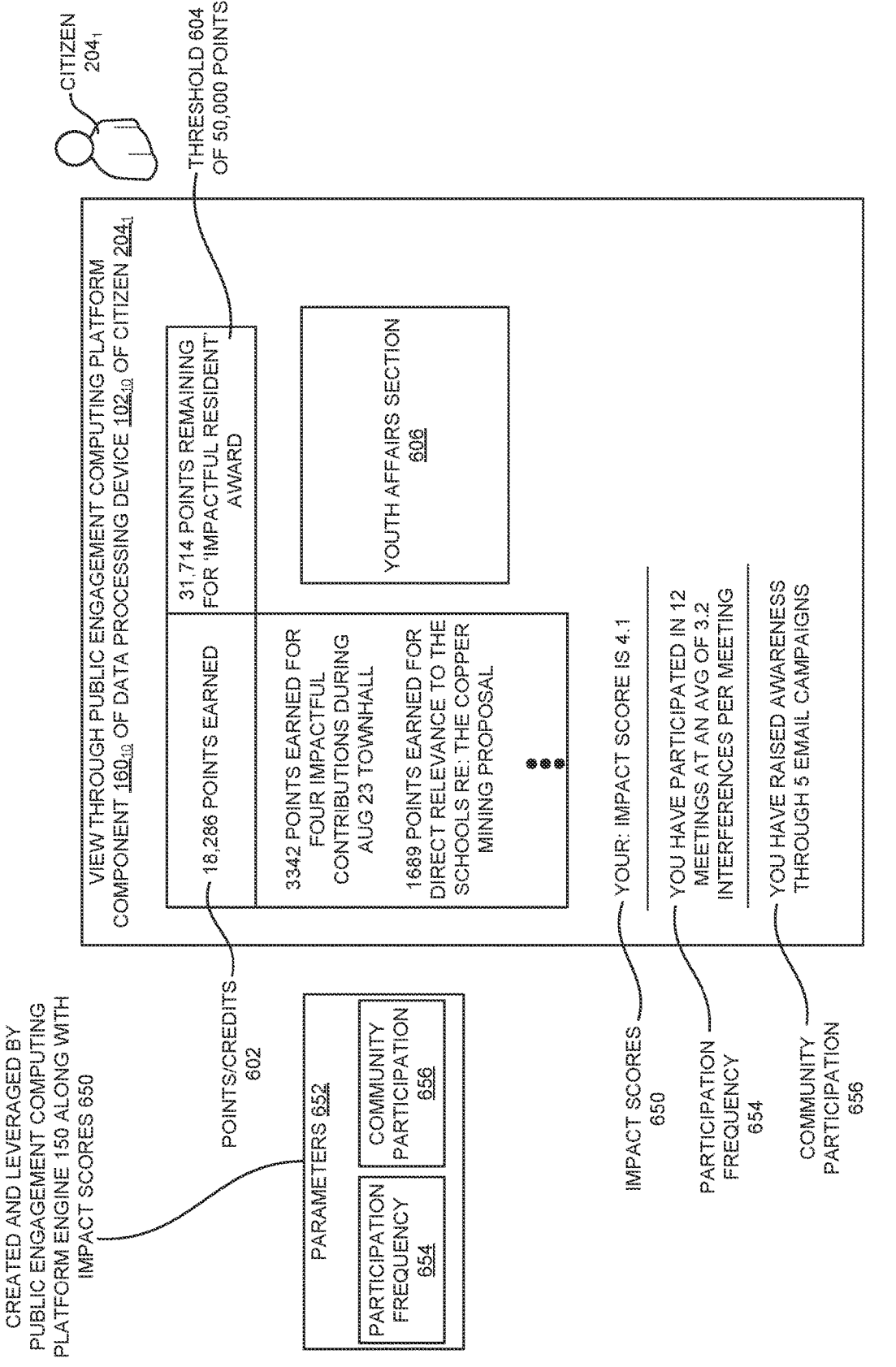
FIG. 6 is a schematic view of a gamification context enabled through the public engagement computing platform engine of FIG. 1 and FIG. 4.

In one or more embodiments, based on executing ML and/or generative AI algorithms 402, public engagement computing platform engine 150 may leverage the power of AI to suggest policy changes and/or new initiatives based on patterns and/or insights derived from the abovementioned repository of data. FIG. 6 shows a gamification context enabled through public engagement computing platform engine 150. In one or more embodiments, public engagement computing platform engine 150 may, based on execution of profiling module 432 and leveraging user data 434 and/or user information 436, provide for points allocation, rewards allocation and/or recognition for participation of citizens 204₁₋ₚ in city council meetings (e.g., live meeting 202). In one or more embodiments, constructiveness (e.g., based on a quantifiable quality and/or impact of comments 482; impact scores 650) of the participation in addition to other parameters (e.g., parameters 652) such as a frequency of participation (e.g., participation frequency 654), activity (e.g., community participation 656) within the community and so on may contribute to increased points allocation, rewards allocation and/or recognition.

FIG. 6 shows a view through a public engagement computing platform component 160₁₀ of an example data processing device 102₁₀ of a citizen 204₁. In accordance therewith, citizen 204₁ may be able to view points/credits 602 thereof based on participation and/or contribution to community meetings including live meeting 202. Citizen 204₁ may also view a detailed breakup of points/credits 602, as seen in FIG. 6. Once points/credits 602 exceed a threshold (e.g., threshold 604 of 50,000 in FIG. 6), citizen 204₁ may be invited to receive a community recognition award. Other forms of gamification are within the scope of the exemplary embodiments discussed herein. Additionally, as shown in FIG. 6, a separate section (e.g., youth affairs section 606) viewable through public engagement computing platform component 160₁₀ may be dedicated specifically for youth to voice opinions thereof. In the context of live meeting 202, a dedicated segment may be allotted for youth participation. In the context of a virtual live meeting 202, youth citizens 204₁₋ₚ may access a dedicated segment or an interface (e.g., an application interface) via public engagement computing platform component 160₂₋ₙ (e.g., public engagement computing platform component 160₁₀).

In one or more embodiments, in accordance with the employment of voice responsive devices 104₁₋ₘ to gather and/or synthesize community-centric solutions from user data 434, comments 482 and/or other such as voice inputs 484, audio data 486 and/or text data 488, public engagement computing platform engine 150 may promote a collaborative approach to governance and/or democracy. During times of emergencies, in one or more embodiments, voice responsive devices 104₁₋ₘ may be employed to quickly gather comments (e.g., comments 320/comments 482) and/or voice inputs (e.g., voice inputs 322/voice inputs 484) and relay community needs and/or feedback to coordinate response efforts effectively.

Figure 7:
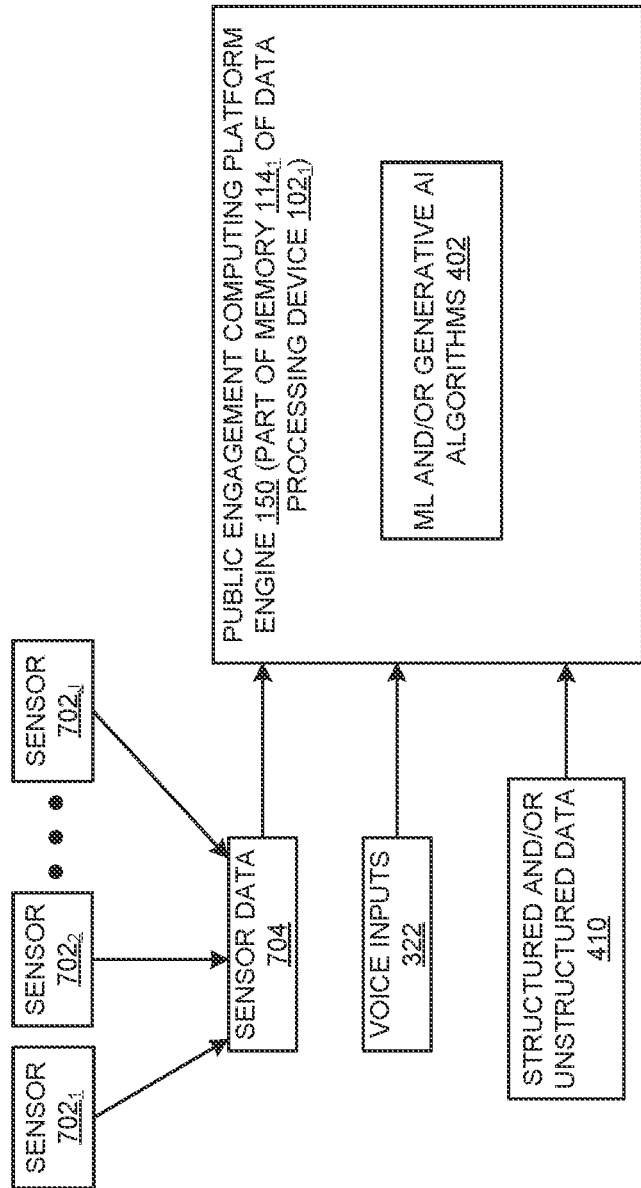
FIG. 7 is a schematic view of integration of the public engagement computing platform engine of FIG. 1 and FIG. 4 with environmental sensors, according to one or more embodiments.

FIG. 7 shows integration of public engagement computing platform engine 150 with environmental sensors 702₁₋ⱼ, according to one or more embodiments. In one or more embodiments, environmental sensors 702₁₋ⱼ (e.g., temperature sensors, precipitation sensors, chemical sensors, gas sensors) may feed sensor data 704 into public engagement computing platform engine 150/ML and/or generative AI algorithms 402 to provide real-time data during discussions in live meeting 202 regarding environmental policy. For example, sensor data 704 causing detection of alarming harmful gas levels in the environment of location 250 through Ml and/or generative AI algorithms 402 may serve to not only provide for training data 412 but also to garner support for concerted actions. In one or more embodiments, ML and/or generative AI algorithms 402 may be implemented to, based on sentiment indicators 418 and/or analyses of comments 320/voice inputs 322, remind (e.g., automatically and/or in "real-time"/near-"real-time") participants (e.g., citizens $204_{1-P}$) in live meeting 202 to maintain civility and/or respect when discussions become heated. Thus, in one or more embodiments, public engagement computing platform engine 150 may have AI implemented therethrough to moderate live meeting 202 and/or associated discussions.

In one or more embodiments, based on the training imparted to the generative AI implemented through ML and/or generative AI algorithms 402, voice responsive devices $104_{1-M}$ may be employed to organize and/or conduct educational sessions on key local issues before city council elections, thereby increasing public awareness and/or understanding. In one or more embodiments, these learnings may be imparted via content generated by the generative AI upon being prompted through one or more wakeup commands 334. In one or more embodiments, the sentiment analyses discussed above may be performed over extended periods of time to gauge changing public opinions on long-term projects and/or policies.

In one or more embodiments, the generative AI-based content delivery possibilities through public engagement computing platform engine 150 that analyzes the repository of data discussed above to derive insights and/or summaries from city council meetings including live meeting 202 may facilitate partnering with local media to provide the aforementioned derived insights and/or summaries, thereby increasing information outreach. In one or more embodiments, citizens $204_{1-P}$ may, through public engagement computing platform component $160_{2-N}$/public engagement computing platform, be allowed to set alerts for specific topics and/or issues of interest; citizens $204_{1-P}$ may thus be kept engaged and/or informed. In one or more embodiments, ML and/or generative AI algorithms 402 may tag and/or classify issues and/or topics of interest to facilitate the aforementioned alerts.

Examples of queries 332 allied with wake-up commands 334 may include but are not limited to:

a) "Hey GovGPT™, translate the last comment into Spanish." This may relate to language translation through language translation module 422.

b) "Hey GovGPT™, analyze topics frequently discussed in the past year." This may relate to access of historical data from the repository/data sources $140_{1-K}$ discussed above.

c) "Hey GovGPT™, please help with a tie vote on Agenda Item No. 2." This may be an example of emergency handling.

d) "Hey GovGPT™, please justify the passing or not passing of Agenda Item No. 2." This may be a justification context.

e) "Hey GovGPT™, predict the top concerns for next month's meeting." This may be a predictive analytics context, i.e., the use of predictive analytics engine 426 to generate predicted data 428, the top concerns.

f) "Hey GovGPT™, which topics had the most emotional responses today?" This may be an example use of sentiment indicators 418/sentiment analysis engine 408/NLP engine 404 to set an emotion-driven agenda.

g) "Hey GovGPT™, show me a summary of comments made by resident John Doe." This may be an example of a profiling context enabled through profiling module 432; the results may be viewable through dashboard 500.

h) "Hey GovGPT™, display the current sentiment dashboard." This may involve the output of sentiment analysis engine 408 and generation of dashboard 500.

i) "Hey GovGPT™, generate a summary of today's meeting." This may leverage the automated summary of live meeting 202 generated through public engagement computing platform engine 150.

j) "Hey GovGPT™, how many remote attendees are in the VR space now?" This keeps track of citizens $204_{1-P}$ integrated with public engagement computing platform engine 150 with VR during live meeting 202.

k) "Hey GovGPT™, alert residents who commented on the zoning issue about the new update." This may leverage the capabilities of public engagement computing platform engine 150 to alert citizens $204_{1-P}$ based on leveraging user information 436.

l) "Hey GovGPT™, suggest policy changes based on recent housing comments." This may be an example of gathering AI-powered policy change recommendations discussed above.

m) "Hey GovGPT™, who are the top contributors this month?" This may be an example of a gamification context analogous to the one discussed above, with the question being asked from the side of the system.

n) "Hey GovGPT™, summarize the youth comments from this session." This may be an example of a youth participation context discussed above.

o) "Hey GovGPT™, compile solutions proposed by residents for the traffic issue." This may be an example of the crowd-sourced problem solving discussed above.

p) "Hey GovGPT™, what are the main concerns from residents about the flood response?" This may be an example of a disaster response communication context.

q) "Hey GovGPT™, provide the latest air quality readings in the council discussion." This may be an example context of integration of environmental sensors $702_{1-J}$ with public engagement computing platform engine 150.

r) "Hey GovGPT™, please monitor the discussion for civility." This may be an example AI civility moderation context with respect to live meeting 202.

s) "Hey GovGPT™, schedule an educational session on the proposed tax change." This may be an example educational use context of public engagement computing platform engine 150.

t) "Hey GovGPT™, display sentiment trends with regard to the public transport plan for the last six months." This is an example context of tracking issue-related sentiments over time.

u) "Hey GovGPT™, send a meeting summary to local news outlets." This may be an example context of coordination with local news/media outlets.

v) "Hey GovGPT™, set up alerts for any discussions on local park renovations." This may be an example context for alert customizations for residents/citizens $204_{1-P}$.

Figure 8:
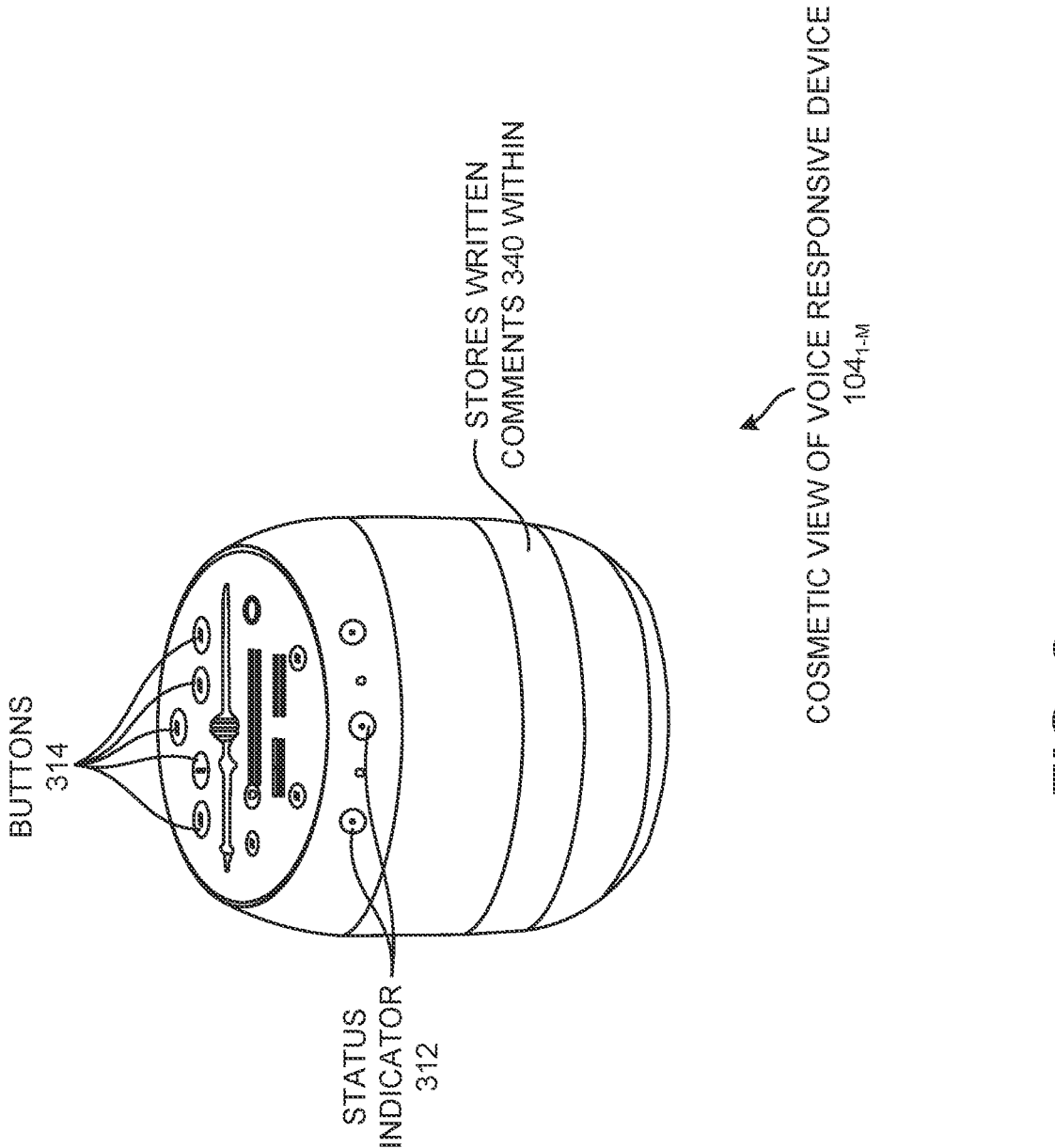
FIG. 8 is an example cosmetic view of the voice responsive device of FIG. 1 and FIG. 3.

It should be noted that the utility of public engagement computing platform engine 150 may not be limited to local politics. In some embodiments designed for legislative bodies such as the Congress, the Parliament and/or the Senate, voice responsive devices $104_{1-M}$ may automatically tabulate votes and summarize comments associated therewith. Here, in one or more embodiments, voice responsive devices $104_{1-M}$ may have to be distributed across the space within the Parliament or any location analogous to location 250. FIG. 8 shows an example cosmetic view of voice responsive device $104_{1-M}$. At a core level, in one or more embodiments, voice responsive device $104_{1-M}$ may be a sophisticated device that leverages state-of-the-art voice recognition (e.g., through voice recognition component 330), NLP (e.g., via NLP engine 404), and data analysis technologies. In one or more embodiments, a primary function of voice responsive device $104_{1-M}$ may be to capture, transcribe and/or analyze the spoken words of residents (e.g., citizens $204_{1-P}$) during public comment sessions of meetings (e.g., live meeting 202), thereby transforming verbal/voice inputs (e.g., voice inputs 322) into structured, actionable data (e.g., actionable data 438 including predicted data 428).

As seen above, in one or more embodiments, voice responsive device $104_{1-M}$ may, based on execution of public engagement computing platform engine 150/public engagement computing platform component $310_{1-M}$, enable parsing through a diverse array of citizen/resident opinions, identify key themes, sentiments and/or concerns expressed by the community, as expressed by citizens $204_{1-P}$. In contexts where public comments are numerous, varied and/or often complex, said analyses and/or parsing may be crucial to information organization and/or dissemination. In one or more embodiments, ML and/or generative AI algorithms 402 may detect and/or interpret nuances in languages and provide city council officials $206_{1-3}$ (or, counties, state governments, legislative bodies in general, forums, private companies having public hearings) with insights into the pulse of the community represented thereby to enabled informed decision-making.

In one or more embodiments, public engagement computing platform engine 150 accessed via public engagement computing platform component $310_{1-M}$ may align comments 320 with specific agenda items (e.g., agenda item 280) to enable correlation of public opinions with matters at hand. In one or more embodiments, public engagement computing platform engine 150 may also offer real-time sentiment analysis as discussed above by gauging the emotional tones and/or the urgency of comments 320 being made. In one or more embodiments, the aforementioned feature may particularly be beneficial in managing and/or understanding emotionally charged discussions. In an example implementation, as seen in FIG. 8, voice responsive device $104_{1-M}$ may display color-coded sentiment ratings for comments 320. One or more LED devices may serve as status indicator 312. For example, a blue color light of status indicator 312 may indicate that over 75% of comments 320 are in support of a topic pertaining to agenda item 280 and a red color light thereof may signify that over 75% of comments 320 are in opposition to the topic. A white color light of status indicator 312 may indicate that support and opposition to the topic are approximately equal.

In one or more embodiments, voice responsive device $104_{1-M}$ may store all written comments (e.g., also written comments 340 of FIG. 3) sent to a city council, a government and/or a legislative body prior to a public hearing in memory $306_{1-M}$ thereof. Additionally or alternatively, the aforementioned comments may be transmitted to public engagement computing platform engine 150 for processing and/or analyses therethrough. In one or more embodiments, the storing of the comments may enable understanding and/or managing discussions with strong emotional content by aiding gauging of emotional tones and/or urgency of said comments.

As also discussed above, voice recognition component 330 may enable recognition of individual speakers and, in conjunction with public engagement computing platform engine 150/public engagement computing platform component $310_{1-M}$, assign relevance to various factors such as the speaker's history of civic engagement or geographical location (e.g., user geographical information 440 that may be part of user information 436) thereof with respect to the issue (e.g., issues $292_{1-H}$ that are part of agenda item 280 in FIG. 2) pertaining to agenda item 280 and/or location 250 of live meeting 202. In one or more embodiments, the aforementioned consideration of the factors may allow for a more nuanced understanding of the needs of the community and/or perspectives thereof. In one or more embodiments, as seen in FIG. 8, voice responsive device $104_{1-M}$ may be designed with user-friendliness in mind, and may be easy to integrate into existing legislative body/city council meeting frameworks (e.g., public engagement computing platform 180). In one or more embodiments, voice responsive device $104_{1-M}$ may serve as not just a tool for data collection and/or analyses, but also as a bridge between city council officials $206_{1-3}$/members and constituents thereof to provide for enhanced transparency, responsiveness and/or engagement in local governance or governance in general.

In accordance with the embodiments discussed herein, voice responsive device $104_{1-M}$, in conjunction with public engagement computing platform engine 150, may revolutionize the way officialdom interacts with and/or understands communities relevant thereto to facilitate a more democratic, open and/or responsive decision-making process. In one or more embodiments, comments 320 and/or written comments 340 may be aligned with relevant portions (e.g., issues $292_{1-H}$) of agenda item 280 and organized in a folder. The aforementioned folder may be accessible via public engagement computing platform component $160_{2-N}$. In one or more embodiments, the aforementioned organization may ensure that submissions (e.g., audio, written) from the public may be efficiently categorized and/or easily accessible in relation to the corresponding topics (e.g., issues $292_{1-H}$) on agenda item 280.

In one or more embodiments, actionable data 438 including predicted data 428 may be compared with decisions made by leaders of legislative bodies to enhance policy-making quality through the derivable insights into how the recommendations in actionable data 438 align with or differ from choices made by the leaders/officials. In short, in one or more embodiments, evaluation and/or potential improvement in the effectiveness of policy decisions may be made possible through voice responsive device $104_{1-M}$ in conjunction with public engagement computing platform engine 150.

In one or more embodiments, in accordance with the use of voice responsive device $104_{1-M}$, voice responsive device $104_{1-M}$ may be compact and discreet, analogous to Amazon® Echo Dot® or Google Home®. In one or more embodiments, voice responsive device $104_{1-M}$ may have a sleek, round shape (but not limited thereto) with a minimalistic design to blend into various environments including formal settings like council meetings. In one or more embodiments, depending on the context, it may look patriotic and/or distinctive. For example, in a governmental context, voice responsive device $104_{1-M}$ may have a flag of the United States of America (USA) and/or a symbol of the USA on an outer surface thereof.

Figure 9:
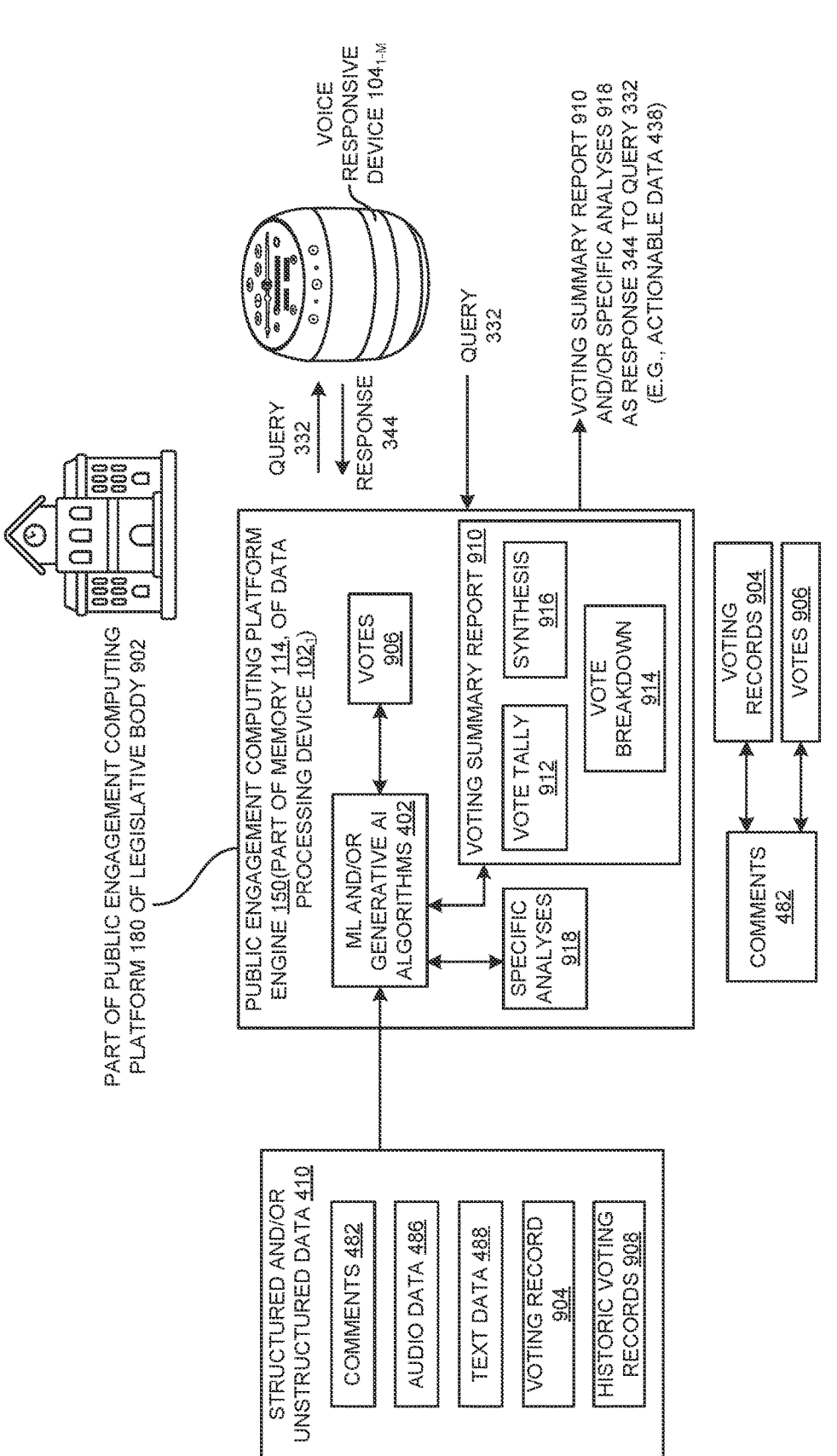
FIG. 9 is a schematic and illustrative view of an example integration of the voice responsive device of FIGS. 1, 3 and 8 into an existing meeting system of a legislative body.

FIG. 9 shows an example integration of voice responsive device $104_{1-M}$ into an existing meeting system (e.g., public engagement computing platform 180) of a legislative body 902. In one or more embodiments, the integration of public engagement computing platform engine 150 or reworking thereof into public engagement computing platform 180 of legislative body 902 may allow access to real-time data on votes and/or speeches (e.g., comments 482, audio data 486 and/or text data 488). Again, based on the advance voice recognition technology (e.g., enabled through voice recognition component 330), individual legislators may be identified and spoken comments (e.g., it should be noted that comments 320 and/or comments 482 may also include comments of the individual legislators/city council officials $206_{1-3}$) thereof during debates and/or discussions directly linked to voting records 904 additionally accessed/accessible by public engagement computing platform engine 150.

As votes are cast verbally and/or through electronic systems, public engagement computing platform engine 150 may record and tabulate the votes (e.g., votes 906) in "real-time" to ensure an up-to-date tally thereof. For each vote, comments 482/comments 320 may be analyzed for comments by the legislators through NLP engine 404/voice recognition engine 420 to understand the context (e.g., context 406), sentiments and/or the key points thereof and link said comments to the specific vote (e.g., part of votes 906).

Again, the vast repository of information from data sources $140_{1-K}$ may be available as historical voting records 908 and past comments (e.g., comments 482) to provide additional context (e.g., can be part of context 406) and comparison to current voting patterns and/or debates. After the voting, public engagement computing platform engine 150 may generate a summary report (e.g., voting summary report 910) accessible through one or more data processing devices $102_{1-N}$. The aforementioned voting summary report 910 may include a vote tally 912, a breakdown of votes by party or a group (e.g., vote breakdown 914) and/or a synthesis 916 of the key arguments and/or points made for and against a motion. In one or more implementations, voting summary report 910 and/or constituents thereof may be made accessible to other legislators, staff and even the public, thereby enhancing transparency and/or understanding of legislative processes.

Legislators and/or staff of public engagement computing system 100 may, using wake-up commands 334 and queries 332, request voting summary report 910 and/or specific analyses 918 such as voting trends, correlations between speeches and vote outcomes and/or sentiment analyses over time. This specific embodiment of public engagement computing system 100/public engagement computing platform engine 150 may serve as a powerful tool for legislative bodies and aid in the efficient management of voting processes. Thus, the understanding of legislative/parliamentary debates may be enhanced, and, thereby, transparency in governmental proceedings promoted.

It should be noted that one or more capabilities of public engagement computing platform engine 150 may be extended to public engagement computing platform component $310_{1-M}$, depending on the processing power and capabilities of voice responsive device $104_{1-M}$. Further, the results (e.g., actionable data 438 and other data discussed above) of all processing through ML and/or generative AI algorithms 402 may be generated in a cohesive form using the generative AI capabilities (e.g., in response to queries 332/queries 494) embedded therein. Still further, the operations performed through public engagement computing platform engine 150/public engagement computing platform component $310_{1-M}$/public engagement computing platform component $160_{2-N}$ such as, for example, synthesis of comments 320, mapping comments 320 to issues $292_{1-H}$, performing sentiment analyses of comments 320, identifying the voices of city council officials $206_{1-3}$, scoring the participation of citizens $204_{1-P}$ and so on may contextualize voice inputs 322 to voice responsive device $104_{1-M}$ with regard to issues $292_{1-H}$ such that said voice inputs 322 may be transformed into, say, actionable data 438 that then may be rendered through voice input device $104_{1-M}$/public engagement computing platform engine 150/public engagement computing platform component $160_{2-N}$. Even incorporating the inputs of environmental sensors $702_{1-J}$ into ML and/or generative AI algorithms 402 may provide for contextualization thereof with regard to issues $292_{1-H}$. All reasonable variations are within the scope of the exemplary embodiments discussed herein.

FIG. 10 shows a process flow diagram detailing the operations involved in realizing a voice responsive device based participative public engagement computing platform, according to one or more embodiments. In one or more embodiments, operation 1002 may involve, during a meeting (e.g., live meeting 202) relevant to a public engagement, automatically processing a voice input (e.g., voice inputs 322) from a voice responsive device (e.g., voice responsive device $104_{1-M}$) associated with a generative AI based public engagement computing platform (e.g., public engagement computing platform 180/public engagement computing platform engine 150/public engagement computing platform 3101-M). In one or more embodiments, the automatic processing may involve contextualizing the voice input with one or more issue(s) (e.g., issues $292_{1-H}$) of an agenda item of the meeting based on training of the generative AI based public engagement computing platform with historical data (e.g., comments 482, voice inputs 483, audio data 486, text data 488 such as transcribed data, emails 492, queries 494, forum posts 496, historical voting records 908) relevant to the one or more issue(s), the agenda item and/or the public engagement, and transforming the contextualized voice input into actionable data (e.g., actionable data 438).

In one or more embodiments, operation 1004 may then involve incorporating the actionable data in a response (e.g., response 344) to a voice query (e.g., again, part of voice queries 322) to the generative AI based public engagement computing platform pertinent to the one or more issue(s), the agenda item, the public engagement, the meeting and/or a source of the voice input.

Figure 11:
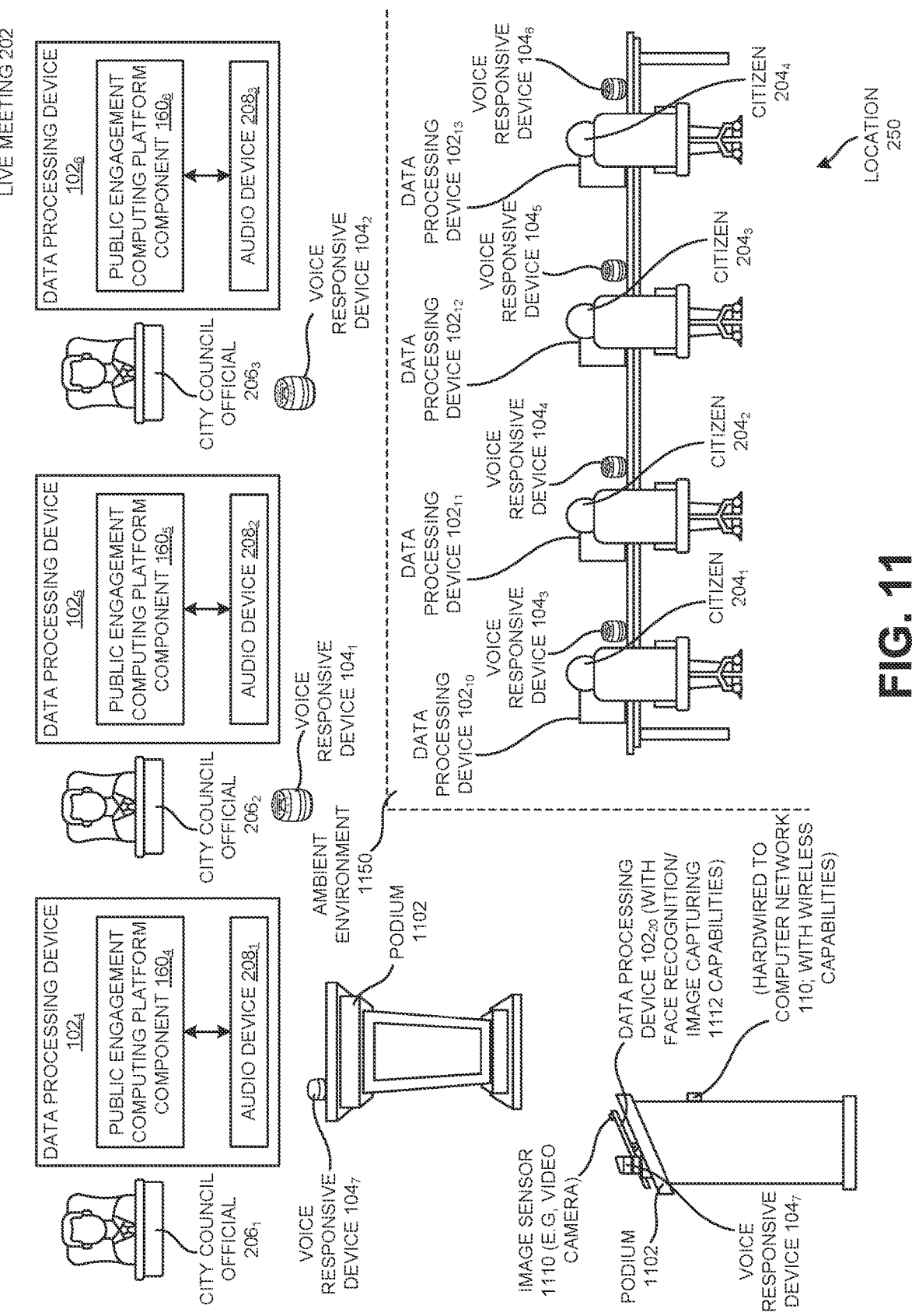
FIG. 11 is a schematic view of another context of the live meeting of FIG. 2.

FIG. 11 shows another example context of live meeting 202. Here, citizens $204_{1-4}$ may be seated around a table and have data processing devices $102_{10-13}$ associated therewith each executing public engagement computing platform component $160_{10-13}$ thereon. It should be noted that the number of citizens $204_{1-P}$ (e.g., 4 here) and the number of city council officials $206_{1-3}$ (e.g., 3 here) are merely for example purposes and should not be considered limiting. City council officials $204_{1-2}$ may speak at a podium 1102 within location 250 from which clear views thereof to citizens $204_{1-4}$ may be facilitated. Additionally, as seen in FIG. 2, city council officials $206_{1-3}$ may be at respective data processing devices $102_{4-6}$ with audio devices $208_{1-3}$. In a number of scenarios, it would suffice for voice inputs 322 from city council officials $206_{1-3}$ to be captured through voice responsive devices $104_{1-2}$. FIG. 11 shows podium 1102, according to an example implementation. Podium 1102 may include a data processing device $102_{20}$ slantedly placed against a frame thereof. A voice responsive device $104_7$ may be placed on podium 1102 (or, in proximity thereto) to capture (e.g., via audio input device 302) voice inputs 322 from the speaker therethrough. Data processing device $102_{20}$ may be hardwired to computer network 110 and/or provided with wireless capabilities to communicate through computer network 110 within public engagement computing system 100.

Figure 12:
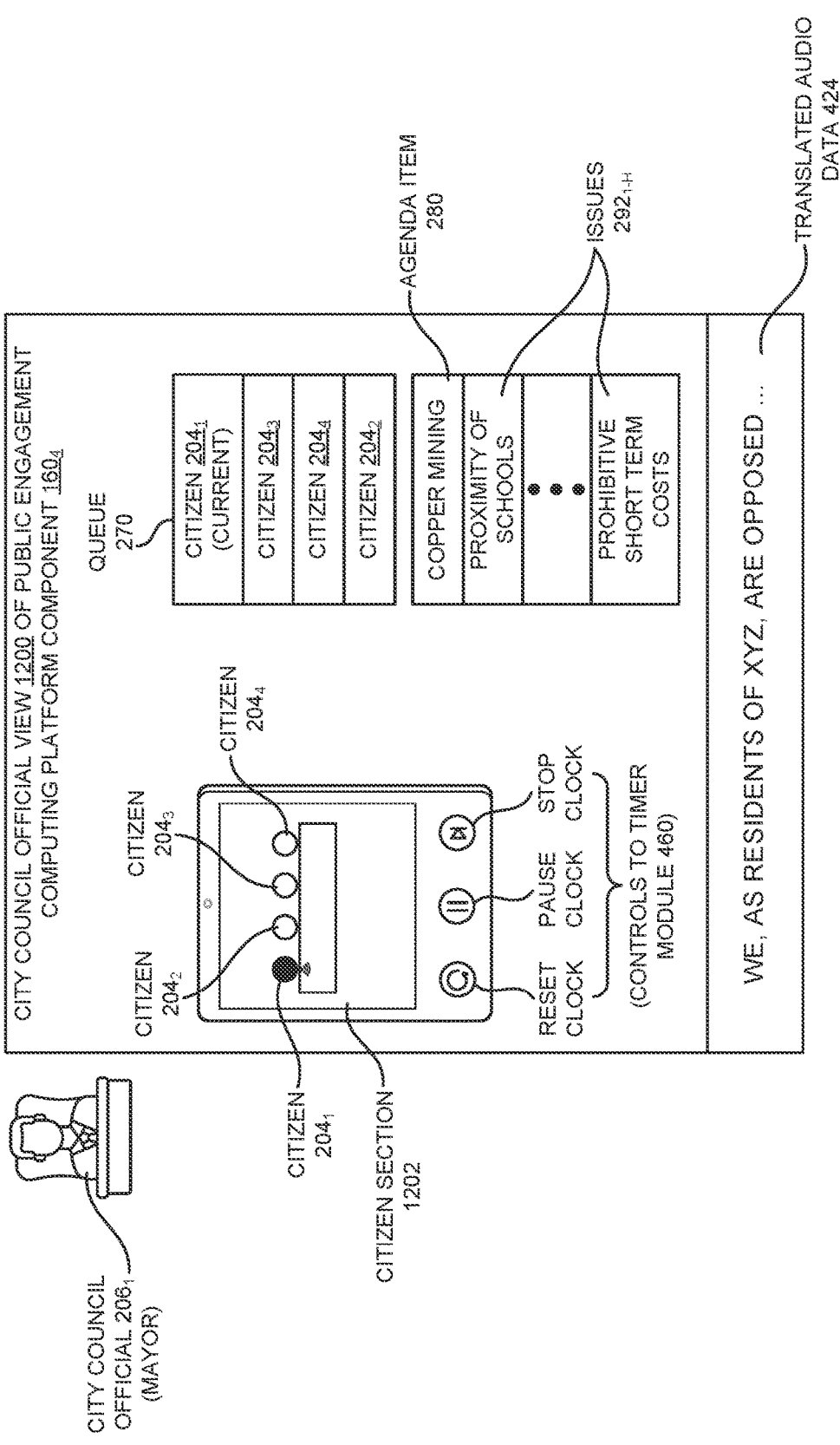
FIG. 12 is an example view of the public engagement computing platform component of a data processing device associated with a city council official (mayor) in accordance with the live meeting context of FIG. 11.

Data processing device $102_{20}$ may have an image sensor 1110 (e.g, video camera) associated therewith and public engagement computing platform component $160_{2-N}$ thereon may provide for image capturing and/or face recognition capabilities through data processing device $102_{20}$. FIG. 11 shows face recognition/image capturing 1112 as being a feature of data processing device $102_{20}$). It should be noted that even a citizen $204_{1-4}$ may be invited to speak to podium 1102 and face recognition/image capturing 1112 may be a useful feature with respect to city council officials $206_{1-3}$ recognizing citizens $204_{1-4}$. It should be noted that, in accordance with the roles of city council officials $206_{1-3}$ and/or citizens $204_{1-4}$, voice responsive devices $104_{1-7}$/ public engagement computing platform components $310_{1-7}$ and/or views exposed through public engagement computing platform components $160_{4-6}$/$160_{10-13}$ may be customized therefor. In accordance therewith, as mentioned above, in some implementations, one or more of data processing devices $102_{4-6}$ and/or data processing devices $102_{10-13}$ may be standalone/smart display unit(s) whose public engagement computing platform component(s) $160_{4-6}$ and public engagement computing platform component(s) $160_{10-13}$ customize the views shown in FIGS. 12-14 (and even FIGS. 15-16). FIG. 12 shows a city council official view 1200 or a mayoral view of public engagement computing platform component $160_4$ executing on data processing device $102_4$ of a mayor (example city council official $206_1$). Here, the mayor may have a citizen section 1202 as an interactive component from which the distribution of the table across which citizens $204_{1-4}$ are distributed may be seen.

As seen in FIG. 11, citizen section 1202 shows citizen $204_1$ speaking (a dark color of the circle representing citizen $204_1$ speaking and the white color of the circles representing the others in wait; color-coding may represent statuses such as "Completed" and "In-Waiting") and the others being in wait. The mayor may also see queue 270 within public engagement computing platform component $160_4$ and agenda item 280 with issues $292_{1-H}$. From within citizen section 1202, the mayor may be able to start and/or stop a clock associated with timer module 460 (e.g., within public engagement computing platform component $160_4$, within public engagement computing platform engine 150, triggered via public engagement computing platform component $310_{1-M}$) to signify the start and/or the end of the speech of citizens $204_{1-4}$ that provides for comments 320 to voice responsive devices $104_{3-6}$. FIG. 11 also shows voice responsive devices $104_{1-7}$ distributed across location 250. Further, the mayor may be able to see the translation (e.g., translated audio data 424) of comments 320 by citizens $204_{1-4}$ via public engagement computing platform component $160_4$ if citizens $204_{1-4}$ speak a language other than a language understood by the mayor and/or a majority. The aforementioned language translation may be effected through another city council official $206_3$ (e.g., a clerk).

Figure 13:
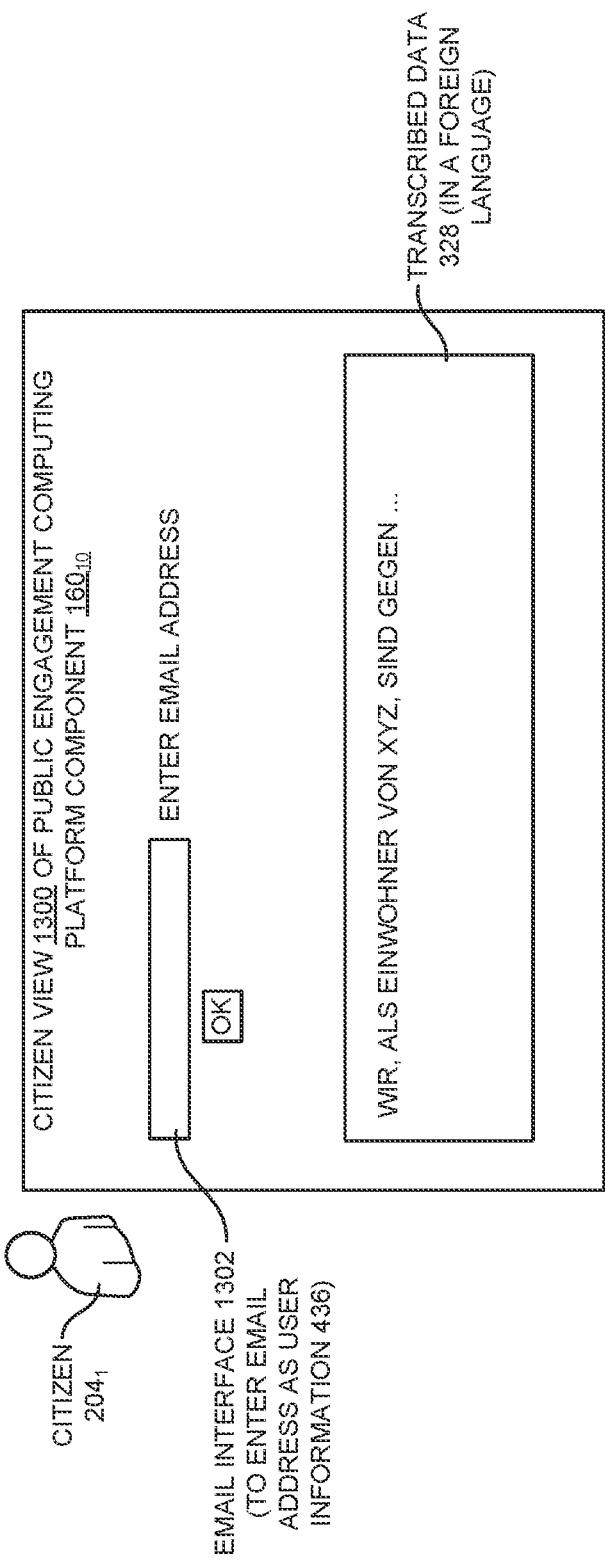
FIG. 13 is an example view of the public engagement computing platform component of another data processing device associated with a citizen in accordance with the live meeting context of FIG. 11.

FIG. 13 shows a citizen view 1300 of public engagement computing platform component $160_{10}$ executing on data processing device $102_{10}$ of citizen $204_1$. Citizen view 1300 may be the perspective of what citizen $204_1$ sees while speaking during live meeting 202. Citizen view 1300 may offer an email interface 1302 which, upon being clicked, may enable citizen $204_1$ to enter an email identifier (e.g., part of user information 436) thereof. The completion of the process of entering the email identifier may start the clock for citizen $204_1$ to speak. When citizen $204_1$ speaks a foreign language or a non-dominant language for one or more reasons (e.g., unfamiliarity with the dominant language), a language translation component 338 of one or more voice responsive devices $104_{3-6}$ in proximity to citizen $204_1$ may automatically detect the non-dominant language content therein and, by itself or in conjunction with language translation module 422, translate comments 320 from citizen $204_1$ into the dominant language (e.g., English) as translated audio data 424 that is rendered via public engagement computing platform component $160_4$ associated with the mayor.

Figure 14:
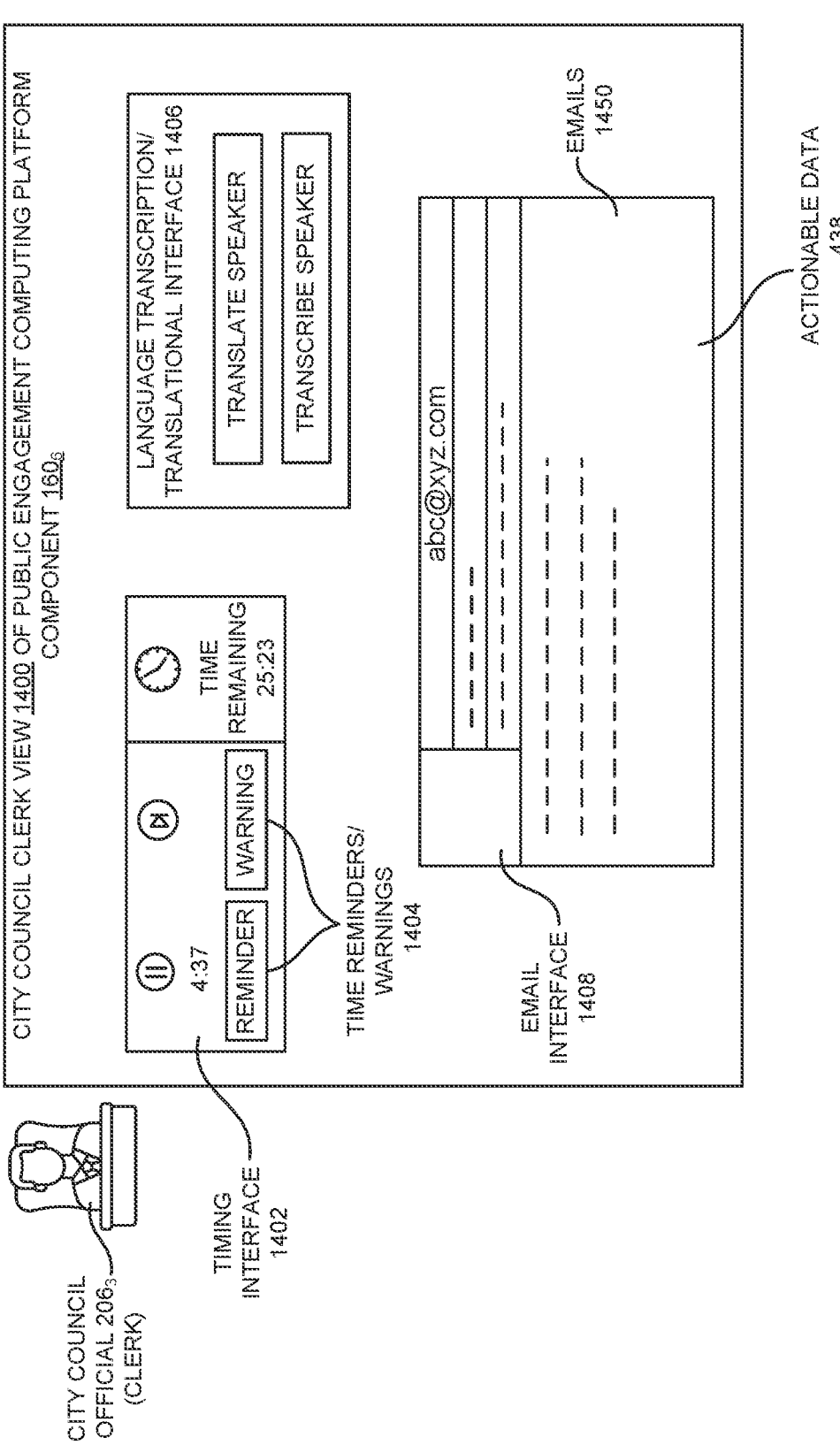
FIG. 14 is an example view of the public engagement computing platform component of yet another data processing device associated with another city council official (clerk) in accordance with the live meeting context of FIG. 11.

With regard to citizen $204_1$, citizen $204_1$ may view a transcription (e.g., transcribed data 328) of comments 320 thereof while speaking via citizen view 1300 based on transcription of comments 320. through transcription component 326 and/or transcription module 414. FIG. 14 shows a city council clerk view 1400 of public engagement computing platform component $160_6$ executing on data processing device $102_6$ of a clerk (example city council official $206_3$) of the city council. Here, the clerk may view timing interface 1402 by which the time allotted to citizen $204_1$ and/or total time allotted to citizens $204_{1-4}$ may be monitored during the speeches/talks thereof. Timing interface 1402 may offer issuance of time reminders/warnings 1404 to citizen $204_1$. For example, clicking a time reminder 1404 may automatically generate a message such as "You have one minute remaining." Clicking a time warning 1404 may automatically generate a message such as "You have exceeded your time allotted by one minute" and so on. The aforementioned timing interface 1402 may also enable the clerk to issue a polite verbal reminder and/or warning to citizen $204_1$ of his/her time.

FIG. 14 also shows a language transcription/translational interface 1406 through which the clerk may assist the mayor in having the non-dominant language spoken by citizen $204_1$ translated and/or the dominant language transcribed therefor. The clerk may also transmit emails 1450 to citizens $204_{1-4}$ via email interface 1408 that may offer the automatically contextualized data as actionable data 438 pre-populated based on comments 320/voice inputs 322 from citizens $204_{1-4}$ and/or the repository of data from data sources $140_{1-K}$ discussed above. The clerk may customize an email 1450 to be sent that further trains ML and/or generative AI algorithms 402. All reasonable variations are within the scope of the exemplary embodiments discussed herein. It should be noted that comments 320 discussed herein with regard to FIGS. 1-13 and FIGS. 15-16 below may not be limited to active comments 320. In one implementation, audio input device 302 of voice transcription devices $104_{1-M}$ may be listening in on an ambient environment (e.g., ambient environment 1150) of FIG. 11 and may incorporate any voice input 322 from ambient environment 1150 as an input thereto to aid contextualization thereof to issues $292_{1-H}$, agenda item 280 and/or the associated public engagement (e.g., live meeting 202, other contexts associated therewith).

Further, it should be noted that voice responsive device $104_{1-M}$, upon detection of a non-dominant language within a voice input 322, may automatically, based on execution of public engagement computing platform component $310_{1-M}$ cause translation of voice input 322 through language translation component 338/language translation module 422 as translated audio data 424. In some contexts, voice input 322 with foreign/non-dominant language content detected therein may automatically serve as a wake-up command 334.

Figure 15:
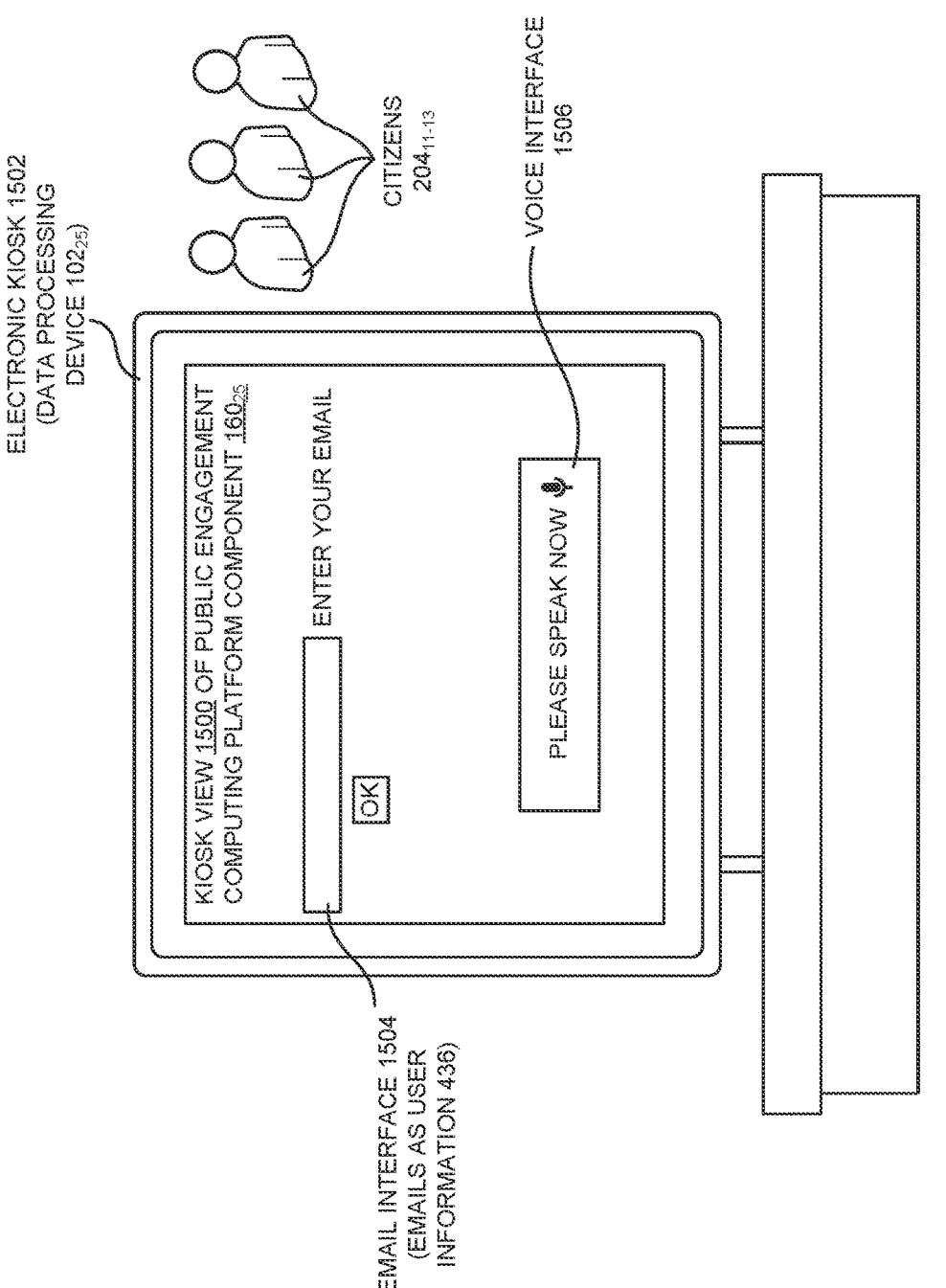
FIG. 15 is an example schematic view of an electronic kiosk in accordance with the live meeting context of FIG. 11.

FIG. 15 shows an electronic kiosk 1502 as an example data processing device 102₂₅. Here, electronic kiosk 1502 may be placed in the vicinity of location 250, a periphery thereof and/or at a building (e.g., a City Council building, a City Hall) associated with live meeting 202 to enable collection of comments 320 from citizens 204₁₁₋₁₃ not belonging to the set of citizens 204₁₋₄. Again, electronic kiosk 1502 may execute public engagement computing platform component 160₂₅ thereon that offers a kiosk view 1500 to citizens 204₁₁₋₁₃. Kiosk view 1500 may include an email interface 1504 for citizens 204₁₁₋₁₃ to provide user information 436 to public engagement computing platform engine 150 after which citizens 204₁₁₋₁₃ may provide voice inputs 322 (e.g., via voice interface 1506) and/or comments 320 in the form of typed text. Citizens 204₁₁₋₁₃ may also deposit written comments 340 at electronic kiosk 1502.

Figure 16:
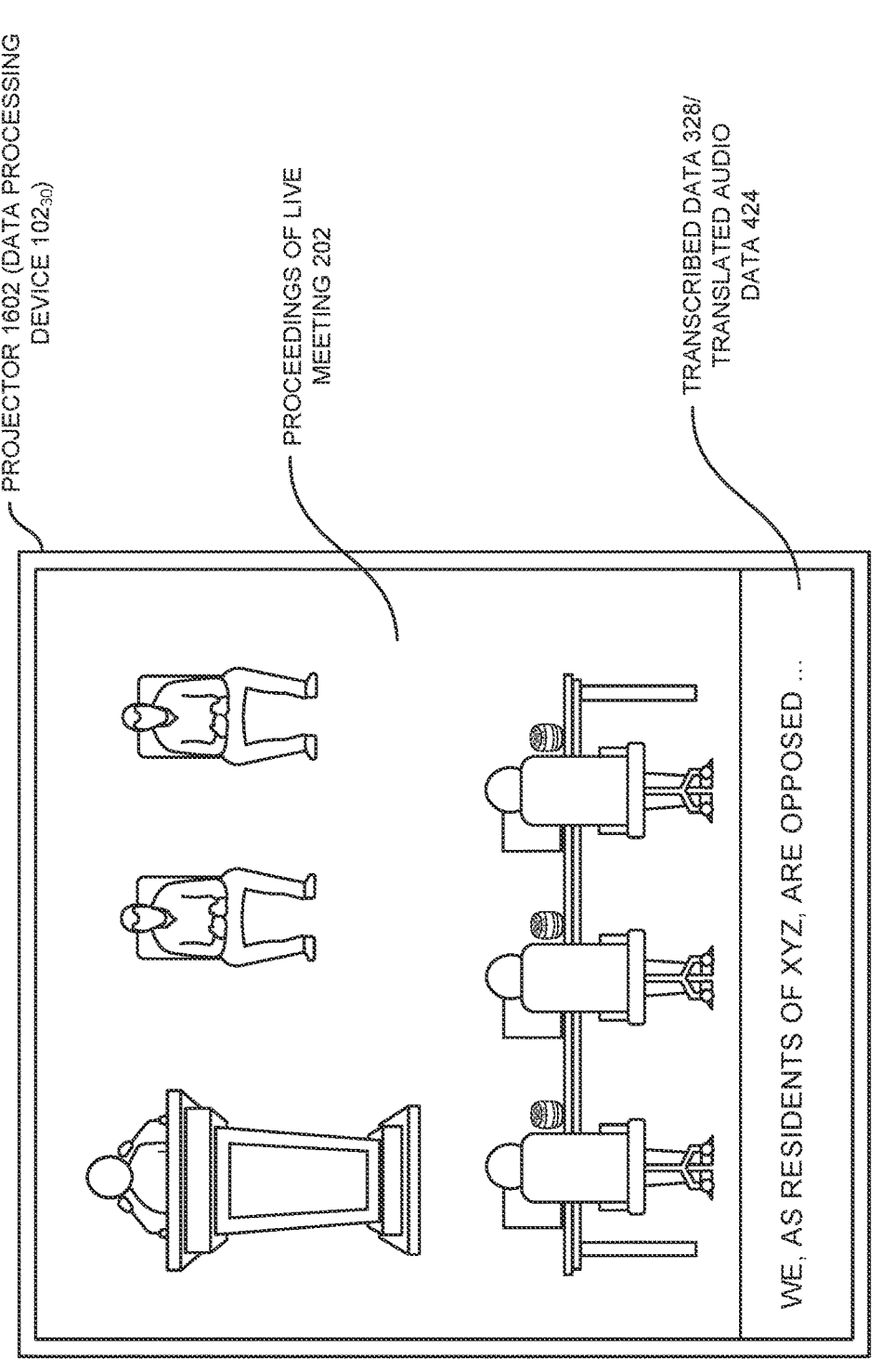
FIG. 16 is an example schematic view of a projector in accordance with the live meeting context of FIG. 11.

FIG. 16 shows a projector 1602 as an example data processing device 102₃₀. Projector 1602 may be placed within location 250, at a periphery thereof and/or outside location 250 at a building associated with live meeting 320 to display proceedings of live meeting 202. Transcribed data 328 and/or translated audio data 424 may be rendered on-screen to facilitate understanding of the proceedings. Other forms of data may be overlaid on public engagement computing platform component 160₃₀ executing on projector 1602. All reasonable variations are within the scope of the exemplary embodiments discussed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium such as a Compact Disc (CD), a Digital Video Disc (DVD), a hard drive). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., public engagement computing system 100, data processing devices 102₁₋ₙ). Accordingly, the specification and drawings are to be regarded in an illustrative rather than a restrictive sense.

What is claimed is:

1. A method of a generative Artificial Intelligence (AI) based public engagement computing platform implemented using a processor communicatively coupled to a memory, comprising;

during a public meeting relevant to a public engagement in which constituents publicly speak in an open forum to a governing body, automatically processing a voice input of a constituent to a voice responsive device associated with the generative AI based public engagement computing platform in accordance with:

contextualizing the voice input of the constituent with respect to at least one issue of an agenda item before the governing body of the public meeting based on training of the generative AI based public engagement computing platform with historical data relevant to at least one of; the at least one issue, the agenda item and the public engagement; and transforming the contextualized voice input of the constituent into actionable data; and incorporating the actionable data in a response to a voice query to the generative AI based public engagement computing platform pertinent to at least one of: the at least one issue, the agenda item, the public engagement, the public meeting and constituent serving as a source of the voice input.

2. The method of claim 1, comprising the public engagement computing platform executing on at least one of: at least one data processing device communicatively coupled to the voice responsive device and the voice responsive device as a component thereof.

3. The method of claim 1, further comprising, in accordance with the processing, at least one of:

automatically transcribing the voice input into at least one of: a first language and a second language;

automatically translating at least one of the voice input and the transcribed voice input from the first language to the second language;

detecting content in the voice input in the first language to cause the automatic translation thereof to the second language; and automatically identifying, as part of contextualizing the voice input, the source of the voice input based on the training of the generative AI based public engagement computing platform.

4. The method of claim 1, where the automatic processing of the voice input further comprises performing sentiment analysis thereon in accordance with the training of the generative AI based public engagement computing platform to contextualize the voice input with respect to the at least one issue of the agenda item.

5. The method of claim 1, further comprising at least one of:

receiving the voice input from the source as part of a plurality of voice inputs to a plurality of responsive devices comprising the voice responsive device;

scoring participation of originators of at least some of the plurality of voice inputs based on at least one of: a quantifiable impact of the associated voice inputs, identity associated with the participation, a frequency of the participation, a relevance of the participation to the at least one issue, and geographical proximity of the originators to at least one of: a location of the public meeting and the at least one issue; and contextualizing the at least some of the plurality of voice inputs with respect to the at least one issue in accordance with the scoring.

6. The method of claim 1, further comprising at least one of:

contextualizing an input of at least one environmental sensor in addition to the voice input with respect to at least one of: the at least one issue and the agenda item;

contextualizing the voice input in accordance with automatic conversion thereof into text data; and organizing the actionable data in a form accessible via a component of the generative AI based public engagement computing platform executing on a data processing device in response to at least one of the voice query and a query to the generative AI based public engagement computing platform.

7. The method of claim 1, comprising at least one of:

the source of the voice input being being an ambient environment of the public meeting sensed through the voice responsive device;

the historical data comprising at least one of: voice comment data, text comment data, written comment data, audio data, query data, transcribed data, electronic mail data, records and forum post data; and leveraging the voice input to further train the generative AI based public engagement computing platform.

8. A voice responsive device of a generative AI based public engagement computing platform, comprising:

an audio input device to, during a meeting relevant to a public engagement in which constituents publicly speak in an open forum to a governing body, automatically capture a voice input;

a memory;

a processor communicatively coupled to the memory to execute a component of the generative AI based public engagement computing platform to:

in conjunction with the generative AI based public engagement computing platform, automatically process the voice input in accordance with:

contextualizing the voice input with respect to at least one issue of an agenda item before the governing body of the public meeting based on training of the generative AI based public engagement computing platform with historical data relevant to at least one of: the at least one issue, the agenda item and the public engagement, and transforming the contextualized voice input into actionable data, and an audio output device to render the actionable data in response to a voice query to the component of the generative AI based public engagement computing platform pertinent to at least one of the at least one issue, the agenda item, the public engagement, the public meeting and a source of the voice input.

9. The voice responsive device of claim 8, wherein the processor further executes the component of the generative AI based public engagement computing platform to, in accordance with the processing, at least one of:

automatically transcribe the voice input into at least one of: a first language and a second language, automatically translate at least one of: the voice input and the transcribed voice input from the first language to the second language, detect content in the voice input in the first language to cause the automatic translation thereof to the second language, and automatically identify, as part of contextualizing the voice input, the source of the voice input based on the training of the generative AI based public engagement computing platform.

10. The voice responsive device of claim 8, further comprising at least one of:

at least one status indicator device to indicate a status associated with the contextualization of the voice input; and at least one interface to control the capturing of the voice input.

11. The voice responsive device of claim 8, wherein at least one of:

the voice responsive device is powered through at least one of: an Alternating Current (AC) adapter and a battery associated therewith, the voice responsive device transfers the captured voice input to a data processing device also associated with the generative AI based public engagement computing platform via a computer network for further processing therethrough, the voice responsive device is a portable smart voice-assistant based device, and a wake up command associated with the voice responsive device is customized thereto.

12. A computing system comprising:

a data processing device executing instructions associated with a generative AI based public engagement computing platform thereon; and a plurality of voice responsive devices, each executing a component of the generative AI based public engagement computing platform and communicatively coupled to the data processing device through a computer network, wherein, during a meeting relevant to a public engagement in which constituents publicly speak in an open forum to a governing body in which constituents publicly speak in an open forum to a governing body, at least one of: the component of the generative AI based public engagement computing platform and the generative AI based public engagement computing platform:

automatically processes a voice input to the each voice responsive device in accordance with:

contextualizing the voice input with respect to at least one issue of an agenda item of the public meeting based on training of the generative AI based public engagement computing platform with historical data relevant to at least one of: the at least one issue, the agenda item and the public engagement, and transforming the contextualized voice input into actionable data, and wherein the at least one of: the component of the generative AI based public engagement computing platform and the generative AI based public engagement computing platform also incorporates the actionable data in a response to a voice query thereto pertinent to at least one of: the at least one issue, the agenda item, the public engagement, the public meeting and a source of the voice input.

13. The computing system of claim 12, wherein:

the plurality of voice responsive devices is distributed in space across a location of the public meeting, and the voice input is one of: from the location of the public meeting and from another location remote to the location of the public meeting.

14. The computing system of claim 12, wherein the at least one of: the component of the generative AI based public engagement computing platform and the generative AI based public engagement computing platform, in accordance with the processing, at least one of:

automatically transcribes the voice input into at least one of: a first language and a second language, automatically translates at least one of the voice input and the transcribed voice input from the first language to the second language, detects content in the voice input in the first language to cause the automatic translation thereof to the second language, and automatically identifies, as part of contextualizing the voice input, the source of the voice input based on the training of the generative AI based public engagement computing platform.

15. The computing system of claim 12, where, in accordance with the automatic processing of the voice input, the at least one of the component of the generative AI based public engagement computing platform and the generative AI based public engagement computing platform performs sentiment analysis in accordance with the training of the generative AI based public engagement computing platform to contextualize the voice input with respect to the at least one issue of the agenda item.

16. The computing system of claim 12, wherein, the at least one of: the component of the generative AI based public engagement computing platform and the generative AI based public engagement computing platform:

scores participation of the source of the voice input based on at least one of; a quantifiable impact of the voice input, identity associated with the participation, a frequency of the participation, a relevance of the participation to the at least one issue, and geographical proximity of the source of the voice input to at least one of; a location of the public meeting and the at least one issue, contextualizes the voice input with respect to the at least one issue in accordance with the scoring, and automatically times a speaking duration associated with the public meeting serving as the source of the voice input.

17. The computing system of claim 12, further comprising at least one environmental sensor whose input is additionally contextualized with respect to at least one of: the at least one issue and the agenda item by the at least one of: the component of the generative AI based public engagement computing platform and the generative AI based public engagement computing platform.

18. The computing system of claim 12, wherein the at least one of the component of the generative AI based public engagement computing platform and the generative AI based public engagement computing platform at least one of:

contextualizes the voice input in accordance with automatic conversion thereof into text data, and organizes the actionable data in a form accessible via another component of the generative AI based public engagement computing platform executing on another data processing device in response to at least one of: the voice query and a query to at least one of: the component of the generative AI based public engagement computing platform, the generative AI based public engagement computing platform, and the another component of the generative AI based public engagement computing platform.

19. The computing system of claim 12, wherein at least one of:

the source of the voice input is an ambient environment of the public meeting sensed through the component of the generative AI based public engagement computing platform, the historical data comprises at least one of: voice comment data, text comment data, written comment data, audio data, query data, transcribed data, electronic mail data, records and forum post data, and the generative AI based public engagement computing platform leverages the voice input for further training thereof.

20. The computing system of claim 12, wherein the each voice responsive device is a portable smart voice-assistant based device.

\*    \*    \*    \*    \*